(12) United States Patent
Jung et al.

(10) Patent No.: US 10,482,325 B2
(45) Date of Patent: Nov. 19, 2019

(54) USER AUTHENTICATION METHOD AND ELECTRONIC DEVICE SUPPORTING THE SAME

(71) Applicant: Samsung Electronics Co., Ltd., Suwon-si, Gyeonggi-do (KR)

(72) Inventors: Dae-kwang Jung, Suwon-si (KR); Jun-ho Koh, Suwon-si (KR); Byeong-hoon Kwak, Uiwang-si (KR); Sung-chan Kim, Suwon-si (KR); Chang-han Kim, Suwon-si (KR); Hyun-jung Kim, Suwon-si (KR); In-hak Na, Yongin-si (KR); Kang-jin Yoon, Seoul (KR); Yong-chan Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/180,691

(22) Filed: Jun. 13, 2016

(65) Prior Publication Data

US 2016/0364610 A1 Dec. 15, 2016

(30) Foreign Application Priority Data

Jun. 15, 2015 (KR) .................. 10-2015-0084337

(51) Int. Cl.
*G06K 9/00* (2006.01)
*G06K 9/68* (2006.01)
(52) U.S. Cl.
CPC ....... *G06K 9/00617* (2013.01); *G06K 9/0061* (2013.01); *G06K 9/685* (2013.01)

(58) Field of Classification Search
CPC .......... G06K 9/00617; G06K 9/00597; G06K 9/00604; G06K 9/00885; G06K 9/685; G06K 9/626; G06K 9/0061; G06K 9/00892; G06K 9/0057–00617; G06F 21/32; H04W 12/06; G06Q 20/40145
(Continued)

(56) References Cited

U.S. PATENT DOCUMENTS 5,930,804 A * 7/1999 Yu .......................... G06F 21/32
8,023,699 B2 9/2011 Namgoong
(Continued)

FOREIGN PATENT DOCUMENTS

JP 5126228 B2 1/2013

OTHER PUBLICATIONS

Daugman, John. "How iris recognition works." IEEE Transactions on circuits and systems for video technology 14.1 (2004): 21-30.*
(Continued)

*Primary Examiner* — Wesley J Tucker
(74) *Attorney, Agent, or Firm* — Jefferson IP Law, LLP

(57) ABSTRACT

A user authentication method for an electronic device is provided. The user authentication method includes detecting a content execution event, confirming an authentication level of content related to the detected content execution event, acquiring an appearance image through a camera unit, extracting valid regions related to an iris of a user from the acquired appearance image, and performing an authentication on the user by comparing iris authentication reference information related to a confirmed authentication level with the extracted valid regions.

19 Claims, 20 Drawing Sheets

(58) Field of Classification Search
USPC ............................................................ 382/117
See application file for complete search history.

(56) References Cited

U.S. PATENT DOCUMENTS

| | | | |
|---|---|---|---|
| 8,255,698 B2 | 8/2012 | Li et al. | |
| 9,349,035 B1* | 5/2016 | Gerber | G06K 9/00013 |
| 2008/0069410 A1 | 3/2008 | Ko et al. | |
| 2008/0199054 A1 | 8/2008 | Matey | |
| 2008/0219515 A1* | 9/2008 | Namgoong | G06K 9/0061 |
| | | | 382/117 |
| 2009/0271635 A1 | 10/2009 | Liu et al. | |
| 2010/0074477 A1* | 3/2010 | Fujii | G06K 9/00604 |
| | | | 382/117 |
| 2010/0115611 A1 | 5/2010 | Morihara | |
| 2010/0245042 A1 | 9/2010 | Tsubaki | |
| 2011/0274319 A1* | 11/2011 | Su | A61B 5/117 |
| | | | 382/117 |
| 2012/0308089 A1 | 12/2012 | Lee | |
| 2013/0194407 A1 | 8/2013 | Kim et al. | |
| 2014/0157401 A1* | 6/2014 | Alameh | G06F 21/45 |
| | | | 726/17 |
| 2014/0337945 A1* | 11/2014 | Jia | H04L 63/0876 |
| | | | 726/6 |
| 2015/0071503 A1* | 3/2015 | Prabhakar | G06K 9/0061 |
| | | | 382/117 |
| 2015/0320311 A1* | 11/2015 | Chen | A61B 3/14 |
| | | | 351/206 |
| 2016/0259986 A1* | 9/2016 | Yun | G06K 9/00892 |
| 2017/0337442 A1* | 11/2017 | Um | G06T 7/74 |

OTHER PUBLICATIONS

Proença, Hugo. "Quality assessment of degraded iris images acquired in the visible wavelength." IEEE Transactions on Information Forensics and Security 6.1 (2011): 82-95.*

Dong, Wenbo, et al. "Quality-based dynamic threshold for iris matching." Image Processing (ICIP), 2009 16th IEEE International Conference on. IEEE, 2009.*

Ma, Li, et al. "Personal identification based on iris texture analysis." IEEE Transactions on Pattern Analysis and Machine Intelligence 25.12 (2003): 1519-1533. (Year: 2003).*

* cited by examiner

FIG. 3

| | LOCATION OF ELECTRONIC DEVICE | | | NUMBER OF SURROUNDING USERS | | TYPE OF ELECTRONIC DEVICE | |
|---|---|---|---|---|---|---|---|
| | HOME | COMPANY | OTHERS | NONE | ONE OR MORE | SMARTPHONE | TV |
| UNLOCK | 50% | 80% | 80% | 60% | 70% | 80% | 50% |
| PAYMENT | 80% | 80% | 95% | 80% | 90% | 90% | 90% |
| CONFIDENTIAL DOCUMENT | 95% | 70% | 95% | 90% | 95% | 95% | 95% |
| APPLICATION EXECUTION | 50% | 70% | 70% | 50% | 50% | 60% | 60% |

FIG. 4

| | LOCATION OF ELECTRONIC DEVICE | | | NUMBER OF SURROUNDING USERS | | TYPE OF ELECTRONIC DEVICE | |
|---|---|---|---|---|---|---|---|
| | HOME | COMPANY | OTHERS | NONE | ONE OR MORE | SMARTPHONE | TV |
| UNLOCK | LOW | HIGH | HIGH | INTERMEDIATE | HIGH | HIGH | HIGH |
| PAYMENT | HIGH | HIGH | HIGH | HIGH | HIGH | HIGH | HIGH |
| CONFIDENTIAL DOCUMENT | HIGH | LOW | HIGH | HIGH | HIGH | HIGH | HIGH |
| APPLICATION EXECUTION | LOW | HIGH | HIGH | LOW | LOW | LOW | LOW |

<601>

<603>

<701>

<703>

<901>

<903>

<1101>

<1103>

<1301>

<1303>

<1305>

<1307>

<1401>

<1403>

<1405>

<1407>

<1501>

<1503>

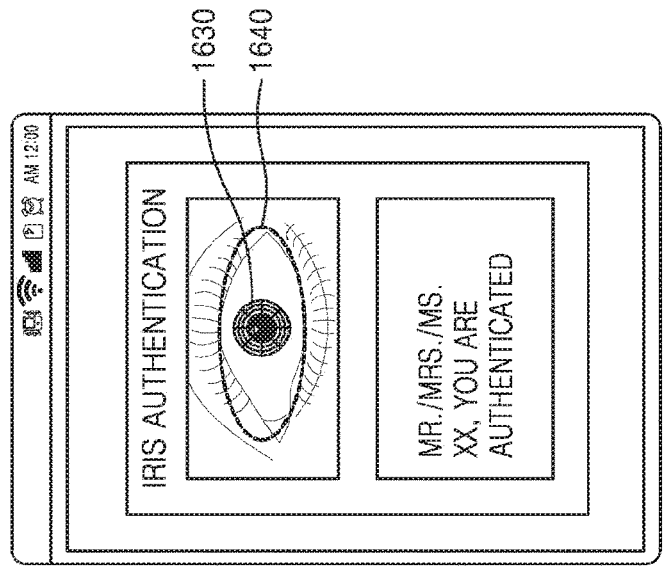
FIG. 16A  FIG. 16B  FIG. 16C
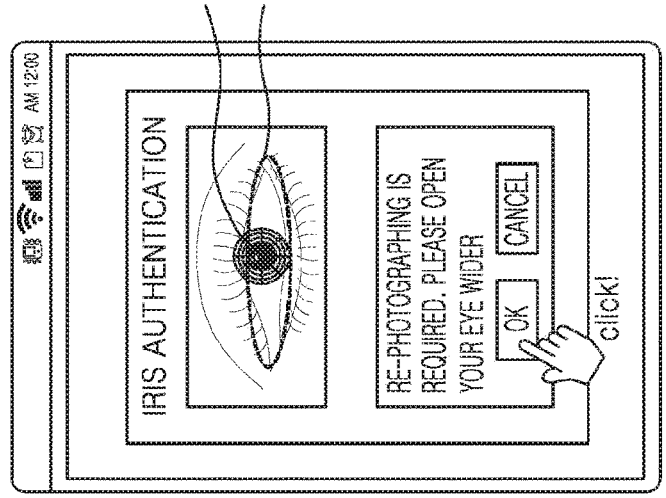
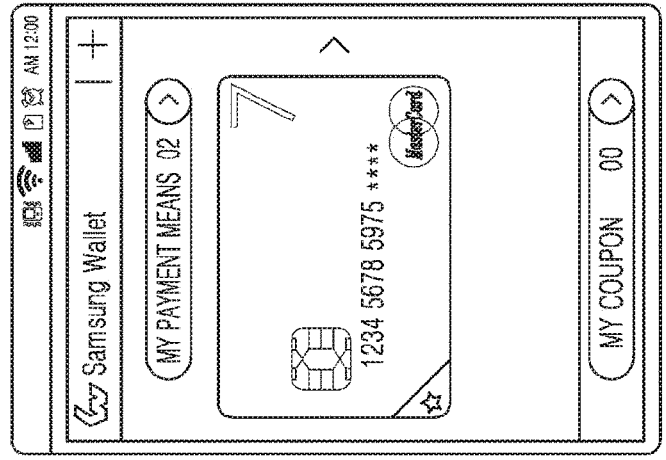

<1801>

<1803>

<1805>

FIG. 19A
FIG. 19B
FIG. 19C
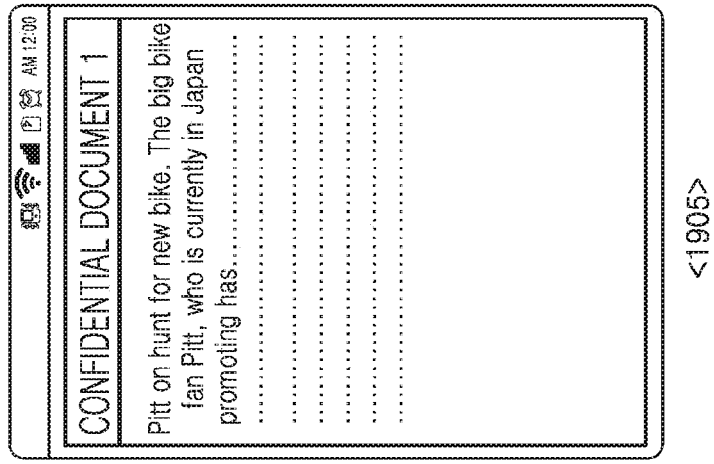
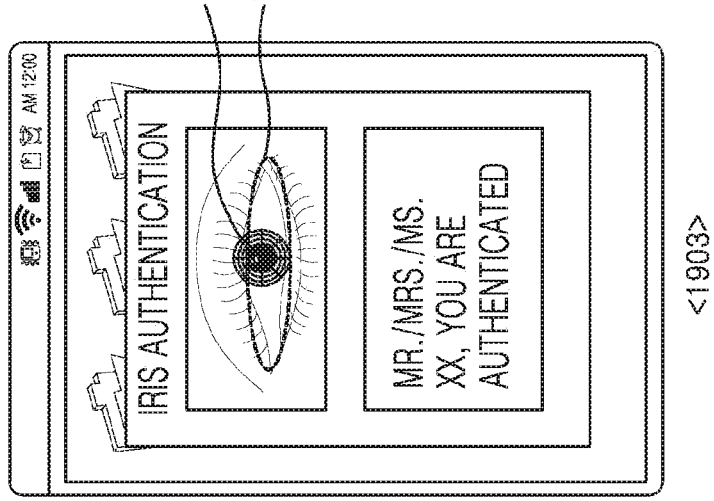
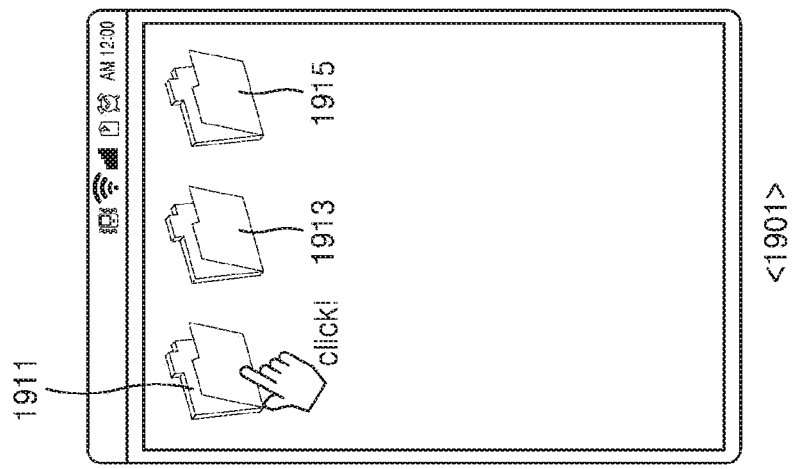

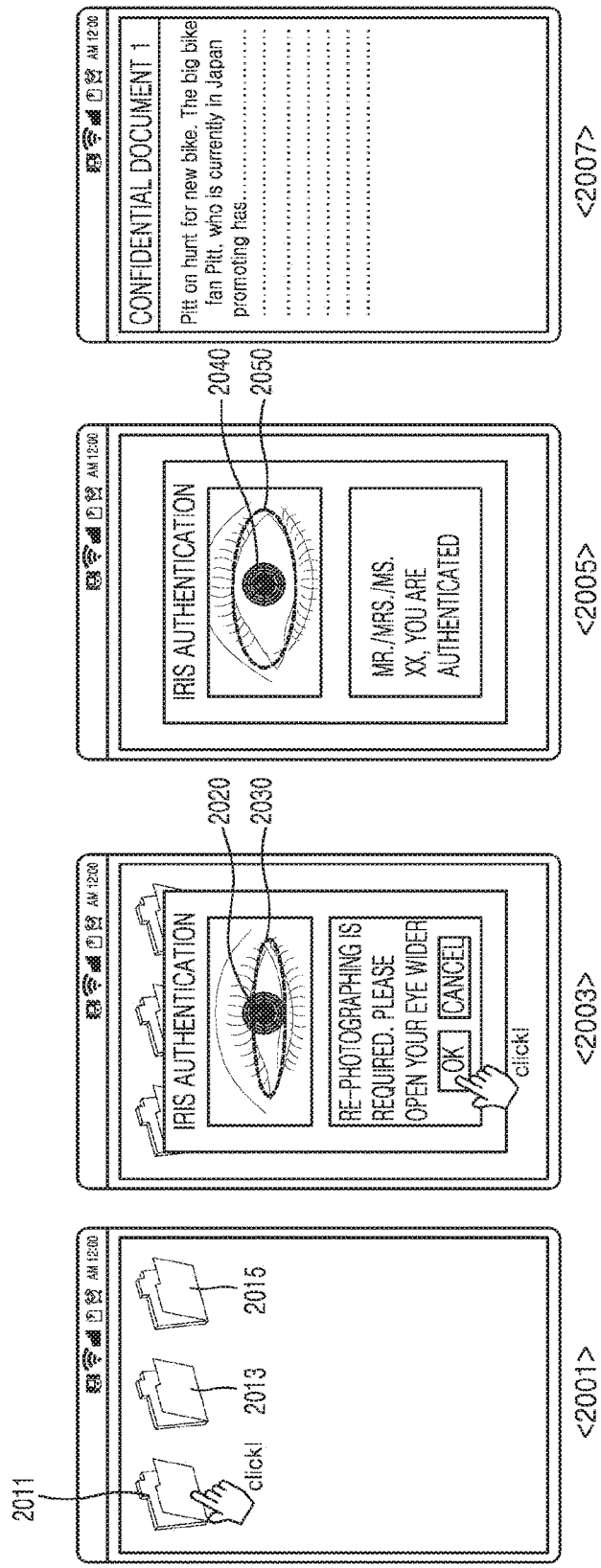

USER AUTHENTICATION METHOD AND ELECTRONIC DEVICE SUPPORTING THE SAME

CROSS-REFERENCE TO RELATED APPLICATION

This application claims the benefit under 35 U.S.C. § 119(a) of a Korean patent application filed on Jun. 15, 2015 in the Korean Intellectual Property Office and assigned Serial number 10-2015-0084337, the entire disclosure of which is hereby incorporated by reference.

TECHNICAL FIELD

The present disclosure relates to a user authentication method and an electronic device supporting the same.

BACKGROUND

Along with the development of information and communications technology, various security systems are in demand. Automatic teller machines (ATMs) of banks require identification information of customers, and facilities such as research institutes for developing new technologies require reinforced security measures. Accordingly, various security techniques have been developed. In this regard, unique information of a user may include not only a password intentionally set by the user but also various pieces of information to identify the user such as a fingerprint, a voice, and handwriting of the user.

Recently, iris information has been used as identification information of a user, and security techniques using iris information have been developed. A pattern of an iris is different for each person, even twins having completely different patterns of irises. Additionally, irises do not change for the entire life, and thus, security techniques using iris information have been spotlighted.

However, the existing security techniques using iris information use the same level of iris authentication that is uniformly applied to content for which the iris authentication is required for execution. For example, in the existing security techniques using iris information, even though a security level required in iris authentication varies for each piece of content, the same threshold value for the iris authentication is applied. In other words, in the existing security techniques using iris information, a system by which iris authentication is successful for content requiring a high level of security when a degree of similarity between an iris acquired by a camera unit including an infrared camera and a pre-registered iris is equal to or greater than the same threshold value set regardless of security necessity for the content is applied. As another example, in the existing security techniques using iris information, the same threshold value for iris authentication is applied regardless of an ambient situation of an electronic device, for example, a current location of the electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a user authentication method of providing convenience to a user and supporting reinforcement of security by adaptively setting an authentication level according to the necessity of security for content of which execution has been requested or ambient information and an electronic device supporting the same.

Additional aspects will be set forth in part in the description which follows and, in part, will be apparent from the description, or may be learned by practice of the presented embodiments.

In accordance with an aspect of the present disclosure, a user authentication method for an electronic device is provided. The method includes detecting a content execution event, confirming an authentication level of content related to the detected content execution event, acquiring an appearance image through a camera unit, extracting valid regions related to an iris of a user from the acquired appearance image, and performing authentication of the user by comparing iris authentication reference information related to a confirmed authentication level with the extracted valid regions.

The appearance image may be an image of at least a portion of a face including an eye of the user.

The iris authentication reference information may include at least one of an area of the iris and a certain region of the iris.

The area of the iris may be a threshold value for at least one of an area of and a number of valid regions corresponding to an iris region among a plurality of divided regions in an iris template to be generated based on the iris region.

The user authentication method may further include determining whether to re-photograph the iris by comparing an iris region in the appearance image with the iris authentication reference information.

In accordance with another aspect of the present disclosure a method for determining whether to re-photograph the iris is provided. The method includes detecting the iris region and a boundary of an eye of the user which are included in the appearance image, dividing the detected iris region into a plurality of regions and generating an iris template corresponding to the plurality of divided regions, and determining whether to re-photograph the iris by comparing at least one of an area of and a number of the extracted valid regions corresponding to the iris region among the plurality of divided regions included in the iris template with a threshold value for the iris region.

In accordance with another aspect of the present disclosure a method for determining whether to re-photograph the iris is provided. The method includes outputting a re-photographing notification.

In accordance with another aspect of the present disclosure a method for user authentication is provided. The method includes setting a threshold value for a degree of similarity between iris information generated from an iris image in the iris region and pre-registered iris information according to the confirmed authentication level.

In accordance with another aspect of the present disclosure a method for determining whether to re-photograph the iris is provided. The method includes determining whether the iris region included in the appearance image includes a certain iris region.

In accordance with another aspect of the present disclosure a method for user authentication method is provided. The method includes checking situation information of the electronic device, wherein the confirming of the authentication level may include confirming if a preset authentication level corresponds to the situation information.

The situation information may include at least one of a location of the electronic device, a location of the user of the electronic device, a number of people around the electronic device, an identity of the people around the electronic device, background information of the electronic device, a user movement history of the electronic device, a moving speed of the electronic device, a re-authentication interval after previous authentication, a type of the electronic device, an internal configuration of the electronic device, ambient illumination of the electronic device, a moving distance of the electronic device, and information as to whether the user who tries the user authentication corresponds to a user registered in the electronic device.

The performing of the authentication on the user may include requesting a server to provide the content for iris authentication and receiving a result of the requested iris authentication from the server.

In accordance with another aspect of embodiment, an apparatus for an electronic device is provided. The apparatus includes, a camera unit configured to acquire an appearance image, and a processor configured to detect a content execution event and confirm an authentication level of content related to the detected content execution event, extract valid regions related to an iris of a user from the appearance image acquired by the camera unit, and perform authentication of the user by comparing iris authentication reference information related to a confirmed authentication level with the extracted valid regions.

The iris authentication reference information may include at least one of an area of the iris and a certain region of the iris.

The area of the iris may be a threshold value for at least one of an area of and a number of valid regions corresponding to an iris region among a plurality of divided regions in an iris template to be generated based on the iris region.

The processor may be further configured to determine whether to perform re-photographing by comparing an iris region in the appearance image with the iris authentication reference information.

The processor may be further configured to detect the iris region and a boundary of an eye of the user which are included in the appearance image, divide the detected iris region into a plurality of regions, generate an iris template corresponding to the plurality of divided regions, and determine whether to perform re-photographing by comparing at least one of an area of and a number of the extracted valid regions corresponding to the iris region among the plurality of divided regions included in the iris template with a threshold value for the iris region.

The electronic device may further include an output unit configured to output a re-photographing notification.

The processor may be further configured to set a threshold value for a degree of similarity between iris information generated from an iris image in the iris region and pre-registered iris information according to the confirmed authentication level.

The processor may be further configured to determine whether the iris region in the appearance image includes a certain iris region.

The processor may be further configured to check situation information of the electronic device and confirm if a preset authentication level corresponds to the situation information.

The situation information may include at least one of a location of the electronic device, a location of the user of the electronic device, a number of people around the electronic device, an identity of the people around the electronic device, background information of the electronic device, a user movement history of the electronic device, a moving speed of the electronic device, a re-authentication interval after previous authentication, a type of the electronic device, an internal configuration of the electronic device, ambient illumination of the electronic device, a moving distance of the electronic device, and information as to whether the user who tries the user authentication corresponds to a user registered in the electronic device.

The processor may be further configured to request a server to provide the content for iris authentication and receive a result of the requested iris authentication from the server.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 3 and 4 illustrate tables for describing the user authentication method of FIG. 2 according to various embodiments of the present disclosure;

FIGS. 16A-16C illustrate iris authentication related diagrams for describing a user authentication method according to various embodiments of the present disclosure;

FIGS. 19A-19C and 20A-20D illustrate iris authentication related diagrams for describing a user authentication method according to various embodiments of the present disclosure.

Throughout the drawings, it should be noted that like reference numbers are used to depict the same or similar elements, features, and structures.

DETAILED DESCRIPTION

Figure 1:
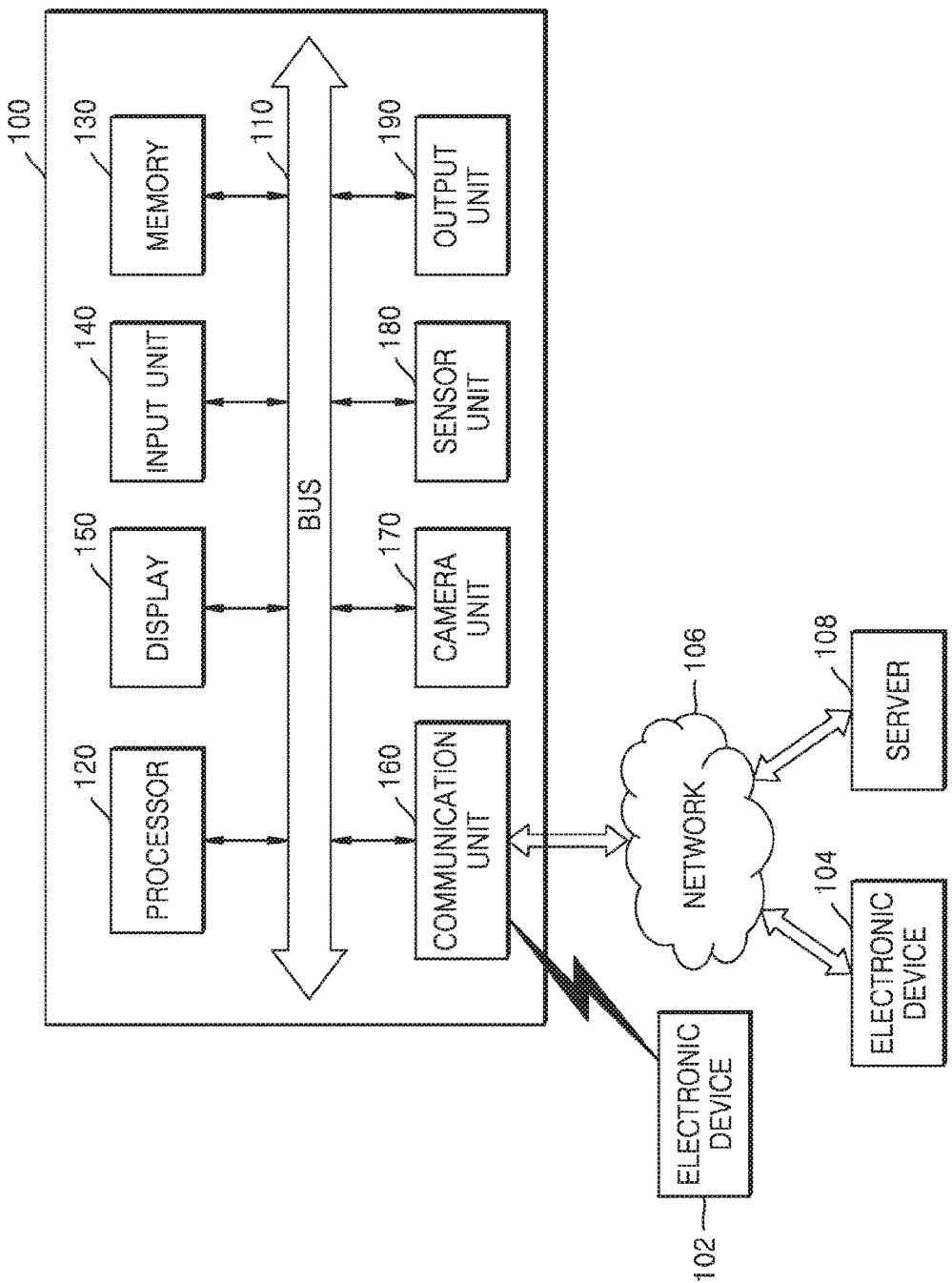
FIG. 1 illustrates an environment of a network including an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

According to an embodiment, the term "electronic device" may be at least one of, for example, a smartphone, a tablet personal computer (PC), a mobile phone, a video phone, an e-book reader, a desktop PC, a laptop PC, a netbook computer, a personal digital assistant (PDA), a portable multimedia player (PMP), an moving pictures experts group (MP3) player, mobile medical equipment, a camera, and a wearable device (e.g., a head-mounted device (HMD) such as electronic glasses, electronic clothing, an electronic bracelet, an electronic necklace, an electronic accessory, an electronic tattoo, or a smart watch). However, the term "electronic device" is not limited to the devices described above.

According to an embodiment, the term "content" may be defined as an application, a function, a service, an object (e.g., a document), or the like used by a user through the electronic device. For example, the term "content" may be an unlock function, a web service function (e.g., a website display function), an application log-in function, or an application execution function of the electronic device. As another example, the term "content" may be a function for a financial transaction, e.g., an account inquiry, an account transfer, a payment, or a securities transaction. As another example, the object may be an electronic document, a video, a photograph, music, or the like. As another example, a content execution event may be a selection or execution according to a user's input or an event without a direct input of the user through a schedule or an external input (e.g., a push notification, a remote control input through a telecommunications network). However, the term "content" is not limited thereto and may include anything which is transmitted, received, executed, or displayed by a user through the electronic device.

According to an embodiment, the term "situation information (context)" may be information about the electronic device except for the content. For example, the term "situation information" may be information about an ambient environment of the electronic device. The information about the ambient environment of the electronic device may be, for example, position information of the electronic device or a user of the electronic device, information about people located around the electronic device or the user of the electronic device (e.g., the number or identity of people), illumination information of the surroundings of the electronic device (e.g., daytime or nighttime), a moving distance of the electronic device or the user of the electronic device, a user movement history, a moving speed, and a re-authentication interval after previous authentication. However, the information about the ambient environment of the electronic device is not limited thereto and may include, for example, weather information, temperature information, humidity information, illumination information, noise information, and sound information as environment information within a certain radius from the electronic device. As another example, the term "situation information" may be information about the electronic device. The information about the electronic device may be, for example, a type of the electronic device, an operating system (OS) for executing the electronic device, and software/hardware of the electronic device such as a central processing unit (CPU), a graphics processing unit (GPU) or a communication unit. As another example, the term "situation information" may be information about whether a user is the user of the electronic device. The information about whether a user is the user of the electronic device may be, for example, determined by comparing user information registered (or logged) in a service for providing the content with information identified from a subscriber identity module (SIM) card included in the electronic device.

According to an embodiment, "iris authentication" may be performed using iris information generated from an iris region (or range) in an image acquired through a camera unit or from an iris image in the iris region.

According to an embodiment, the term "authentication level" for iris authentication may be defined based on whether authentication of the content is set or an authentication level (or authentication strength). According to an embodiment, the term "authentication level" may correspond to a threshold value for an iris region used to determine whether to perform re-photographing. According to another embodiment, the term "authentication level" may correspond to a threshold value for a degree of similarity between iris information (or an iris code) generated from an iris image in an iris region and iris information (or an iris code) generated and registered based on a pre-captured iris image. For example, the threshold value for an iris region or the threshold value for a degree of similarity between the generated iris information (or an iris code) and the pre-registered iris information (or an iris code) may be set according to the authentication level.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects.

The embodiments below relate to a user authentication method and an electronic device supporting the same, and thus a detailed description of features well known to those of ordinary skill in the art to which the embodiments below belong is omitted.

As used herein, expressions such as "at least one of," when preceding a list of elements, modify the entire list of elements and do not modify the individual elements of the list.

FIG. 1 illustrates an environment of a network 106 including an electronic device 100 according to an embodiment of the present disclosure.

Referring to FIG. 1, the electronic device 100 may include a bus 110, a processor 120, a memory 130, an input unit 140, a display 150, a communication unit 160, a camera unit 170, a sensor unit 180, an output unit 190, and the like.

The bus 110 may be a circuit configured to connect the components described above to each other and transmit communication between the components described above.

The processor 120 may, for example, receive a command from one of the components described above (e.g., the memory 130, the input unit 140, the display 150, the communication unit 160, the camera unit 170, the sensor unit 180, or the output unit 190) through the bus 110, interpret the received command, and execute computation or data processing according to the interpreted command.

The memory 130 may store a command or data received from the processor 120 or another component (e.g., the input unit 140, the display 150, the communication unit 160, the camera unit 170, the sensor unit 180, or the output unit 190) or generated by the processor 120 or another component (e.g., the input unit 140, the display 150, the communication unit 160, the camera unit 170, the sensor unit 180, or the output unit 190). The memory 130 may include, for example, programming modules such as a kernel, middleware, an application programming interface (API), and applications. Each of the programming modules described above may be software, firmware, hardware, or combinations thereof.

The kernel may control or manage system resources (e.g., the bus 110, the processor 120, and the memory 130) to be used to perform operations or functions implemented by the other programming modules, e.g., the middleware, the API, and the applications. In addition, the kernel may provide an interface through which the middleware, the API, or an application accesses and controls or manages individual components of the electronic device 100.

The middleware may act as a mediator such that the API or an application communicates and exchanges data with the kernel. In addition, with respect to job requests received from the applications, the middleware may control (e.g., scheduling or load balancing) the job requests by using, for example, a method of allocating a top priority for using system resources (e.g., the bus 110, the processor 120, or the memory 130) of the electronic device 100 to at least one of the applications.

The API is an interface through which the applications control a function provided by the kernel or the middleware and may include, for example, at least one interface or function (e.g., an instruction) for a file control, a window control, image processing, or a text control.

According to one or more embodiments, the applications may include a short message service (SMS)/multimedia messaging service (MMS) application, an e-mail application, a calendar application, an alarm application, a healthcare application (e.g., an application for measuring an amount of exercise or a blood sugar level), an environment information application, and the like. Additionally or generally, the applications may include applications related to information exchanged between the electronic device 100 and an external electronic device (e.g., an electronic device 104). The applications related to the exchanged information may include, for example, a notification relay application for relaying certain information to the external electronic device and a device management application for managing the external electronic device.

For example, the notification relay application may have a function of relaying notification information generated by another application (e.g., the SMS/MMS application, the e-mail application, the healthcare application, or the environment information application) of the electronic device 100 to an external electronic device (e.g., the electronic device 104). Additionally or generally, the notification relay application may, for example, receive notification information from an external electronic device (e.g., the electronic device 104) and provide the received notification information to a user. The device management application may manage (e.g., install, delete, or update), for example, a function (e.g., turning-on/off of an external electronic device (e.g., the electronic device 104) communicating with the electronic device 100 or adjustment of brightness (or resolution) of a display of the external electronic device) of at least a portion of the external electronic device, an application run in the external electronic device, or a service (e.g., a call service or a message service) provided by the external electronic device.

According to one or more embodiments, the applications may include applications assigned according to an attribute (e.g., an electronic device type) of an external electronic device (e.g., the electronic device 104). For example, when the external electronic device is an MP3 player, the applications may include an application related to a music playback. Similarly, when the external electronic device is mobile medical equipment, e applications may include an application related to healthcare. According to an embodiment, the applications may include at least one of an application assigned to the electronic device 100 and application received from an external electronic device (e.g., a server 108 or the electronic device 104).

The input unit 140 may deliver a command or data input by the user through an input and output device (e.g., a voice, a sensor, a keyboard, or a touch screen) to the processor 120, the memory 130, the communication unit 160, the camera unit 170, or the sensor unit 180 via the bus 110. For example, the input unit 140 may provide data related to a touch of the user, which is input through the touch screen, to the processor 120. In addition, the input unit 140 may output a command or data, which has been received from the processor 120, the memory 130, the communication unit 160, the camera unit 170, the sensor unit 180, or the output unit 190 via the bus 110, through the input and output device (e.g., a speaker or a display). For example, the input unit 140 may output voice data, which has been processed by the processor 120, to the user through the speaker.

The display 150 may display various kinds of information (e.g., multimedia data and text data) to the user.

The communication unit 160 may connect communication between the electronic device 100 and an external device (e.g., the electronic device 102, the electronic device 104 or the server 108). For example, the communication unit 160 may communicate with the external device by connecting to a network 106 through wireless communication or wired communication. The wireless communication may include at least one of, for example, wireless fidelity (Wi-Fi), Bluetooth (BT), near-field communication (NFC), global positioning system (GPS), and cellular communication (e.g., long term evolution (LTE), LTE advanced (LTE-A), code division multiple access (CDMA), wideband CDMA (WCDMA), universal mobile telecommunications system (UMTS), WiBro, or global system for mobile communications (GSM)). The wired communication may include at least one of, for example, universal serial bus (USB), high definition multimedia interface (HDMI), recommended standard 232 (RS-232), plain old telephone service (POTS), and Zigbee.

According to an embodiment, the network 106 may be a telecommunications network. The telecommunications network may include at least one of a computer network, the Internet, the Internet of things, and a telephone network. According to an embodiment, a protocol (e.g., a transport layer protocol, a data link layer protocol, or a physical layer protocol) for communication between the electronic device 100 and the external device may be supported by at least one of the applications, the API, the middleware, the kernel, and the communication unit 160.

According to an embodiment, the server 108 may support operations of the electronic device 100 by performing at least one of operations (or functions) to be implemented by the electronic device 100.

According to an embodiment, the camera unit 170 may include an infrared emitting diode (IRED) for acquiring a clear image, an infrared camera unit, a visible-light camera unit, a module for converting an analog image into a digital image, and the like.

According to an embodiment, the camera unit 170 may include at least one of a visible-light illumination unit (not shown) for acquiring reflected light reflected from a subject with respect to a visible light source and an infrared ray (IR) illumination unit (not shown) for acquiring reflected light reflected from a subject with respect to an IR light source. According to an embodiment, whether the visible-light illumination unit or the IR illumination unit is selected as an illumination unit may be properly determined according to a nature, a size, and the like of a subject.

According to an embodiment, the sensor unit 180 may measure a physical amount or detect an operating state of the electronic device 100 and convert the measured or detected information into an electrical signal. The sensor unit 180 may include at least one of, for example, a gesture sensor, a gyro sensor, an atmospheric sensor, a magnetic sensor, an acceleration sensor, a grip sensor, a proximity sensor, a color sensor (e.g., a red, green, and blue (RGB) sensor), a biometric sensor, a temperature/humidity sensor, an illumination sensor, and an ultraviolet (UV) sensor. Additionally or generally, the sensor unit 180 may include, for example, an e-nose sensor (not shown), an electromyography (EMG) sensor (not shown), an electroencephalogram (EEG) sensor (not shown), an electrocardiogram (ECG) sensor (not shown), an IR sensor (not shown), an iris sensor (not shown), or a fingerprint sensor (not shown). The sensor unit 180 may further include a control circuit for controlling at least one sensor included therein.

According to an embodiment, the output unit 190 may include a haptic module for outputting mechanical vibrations, a lamp for outputting light, an audio output unit for outputting a voice, and the like. According to an embodiment, the output unit 190 may output a notification for re-photographing the user through the camera unit 170 under control of the processor 120.

Hereinafter, functions of the processor 120 are described in detail with reference to FIGS. 2 to 5, 6A and 6B, 7A and 7B, 8, 9A and 9B, 10, 11A and 11B, 12, 13A to 13D, 14A to 14D, 15A and 15B, 16A to 16C, 17A to 17D, 18A to 18C, 19A to 19C, and 20A to 20D.

Figure 2:
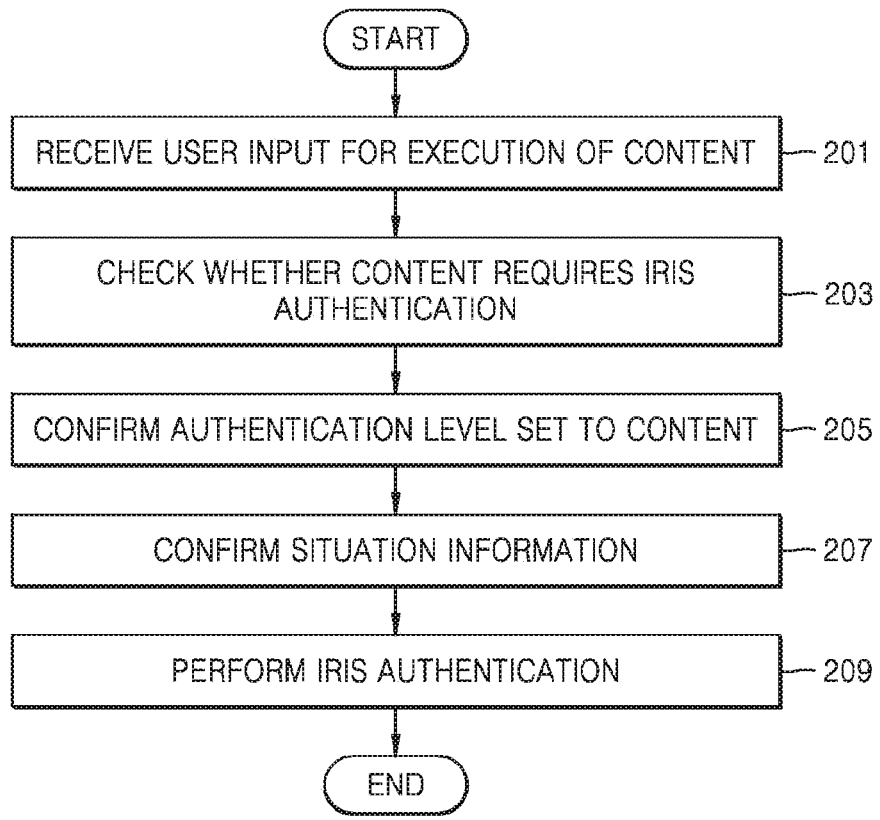
FIG. 2 illustrates a flowchart of a user authentication method according to an embodiment of the present disclosure.

FIG. 2 illustrates a flowchart of a user authentication method according to an embodiment of the present disclosure.

FIGS. 3 and 4 illustrate tables for describing the user authentication method of FIG. 2 according to various embodiments of the present disclosure.

Referring to FIGS. 2 through 4, in operation 201, the processor 120 may receive a user input for an execution of content from the input unit 140. For example, the processor 120 may receive, from the input unit 140 (e.g., a touch panel), a user input for unlocking the electronic device 100. As another example, the processor 120 may receive, from the input unit 140, a user input for an application execution requiring user authentication (or security). As another example, the processor 120 may receive, from the input unit 140, a user input for requesting for an execution of an electronic document requiring user authentication (or security).

In operation 203, the processor 120 may check whether the content requires iris authentication, based on the received user input for an execution of the content. For example, the processor 120 may check whether the content for which execution has been requested is content to be executed only if iris authentication is successful.

According to an embodiment, the processor 120 may check whether the content requires user authentication including iris authentication. According to an embodiment, if the content does not require user authentication, the processor 120 may control the execution of the content without user authentication. As another example, if the content requires another authentication (e.g., fingerprint, pattern, password, voice, signature, or face authentication) except for iris authentication, the processor 120 may control the display 150 to output screen image for a corresponding authentication.

If it is confirmed in operation 203 that the content requires iris authentication, the processor 120 may confirm an authentication level set to the content in operation 205.

According to an embodiment, the authentication level set to the content may be a threshold value for an iris region in an image acquired by the camera unit 170 or for a degree of similarity between iris information (or iris code) generated from the iris region and pre-registered iris information (or iris code).

According to an embodiment, the threshold value for an iris region may be a reference value for determining whether to re-photograph an iris according to an iris region in an image acquired by the camera unit 170. For example, if a size (or range) of an iris region acquired by the camera unit 170 is less than the threshold value, the processor 120 may control the camera unit 170 to re-photograph the iris. As another example, if a size of an iris region acquired by the camera unit 170 is the threshold value or more, the processor 120 may not re-photograph the iris. According to an embodiment, if the iris is not re-photographed, the processor 120 may determine whether iris information generated from the iris region is similar to the pre-registered iris information (or determine a degree of similarity).

According to an embodiment, the threshold value for a degree of similarity between iris information generated from an iris region and the pre-registered iris information may be a reference value for determining whether iris authentication is successful. For example, if a degree of similarity between iris information generated from an iris region and the pre-registered iris information is the threshold value or more, the processor 120 may determine that iris authentication is successful. As another example, if a degree of similarity between iris information generated from an iris region and the pre-registered iris information is less than the threshold value, the processor 120 may determine that iris authentication fails. According to an embodiment, if it is determined that iris authentication fails, the processor 120 may control the camera unit 170 to re-photograph the iris. As another example, if it is determined that iris authentication has failed a preset number of times or more, the processor 120 may end the iris authentication without re-photographing.

According to an embodiment, an authentication level may be set differently according to a degree of requiring security for each piece of content. For example, an authentication level of an application for a financial transaction (e.g., an account inquiry, an account transfer, or a securities transaction) may be set to be higher than an authentication level of an application for a video playback. As another example, when content includes electronic documents of the same type, an authentication level may be set differently according to a degree of requiring security. That is, an authentication level of a document requiring security may be set to be higher than an authentication level of a document which does not require security. As another example, for photograph files of the same type, an authentication level of a photograph file requiring private protection may be set to be higher than an authentication level of a photograph file which does not require private protection.

Referring to FIGS. 3 and 4, when content is an unlock function, a payment function, a confidential document display function, or an application execution function of the electronic device 100, the processor 120 may set an authentication level differently for each piece of the content. For example, when a location of the electronic device 100 is home, the processor 120 may set authentication levels of the content to be 50% (or less) for the unlock function of the electronic device 100, 80% (or more) for the payment function of the electronic device 100, 95% (or more) for the confidential document display function of the electronic device 100, and 50% (or less) for the application execution function of the electronic device 100. However, the content authentication level setup is not limited thereto, and various authentication levels may be set according to a degree of requiring security. According to an embodiment, the processor 120 may set authentication levels of the content according to a user's settings or a designer's intention in a design.

According to an embodiment, authentication levels of the content may be stored in the memory 130 in a table form. For example, the authentication levels of the content may be stored in the memory 130 as a value mapped to each piece of the content.

As another example, when user authentication (or iris authentication) is performed by the server 108, the authentication levels of the content may be stored in a database of the server 108.

In operation 207, the processor 120 may confirm situation information. According to an embodiment, the situation information may be all information about the electronic device 100 except for the content. For example, the situation information may be information about an ambient environment of the electronic device 100. The information about the ambient environment of the electronic device 100 may be, for example, position information of the electronic device 100 or the user of the electronic device 100, information about people (e.g., the number or identity of the people) located around the user of the electronic device 100, ambient background information, information about a movement history of the electronic device 100, information about a moving speed of the electronic device 100, information about a re-authentication interval after previous authentication, information about a type of the electronic device 100, illumination information (e.g., daytime or nighttime) of the surroundings of the electronic device 100, or a moving distance of the electronic device 100 or the user of the electronic device 100.

According to an embodiment, the processor 120 may measure a location of the electronic device 100 by using information received through a GPS. NFC, Wi-Fi, Bluetooth, beacon, or ultrasound input device or the like and internet protocol (IP) information allocated to the communication unit 160. For example, the processor 120 may measure a location of the electronic device 100 by using received Bluetooth low energy (BLE) beacon information. As another example, the processor 120 may receive a location of the electronic device 100 from satellites by using a GPS signal. As another example, the processor 120 may measure a location of the electronic device 100 by using a Wi-Fi service set identifier (SSID) received through a wireless local area network (LAN). As another example, the processor 120 may measure a location of the electronic device 100 by using a cell-ID received from a base station.

According to an embodiment, when a plurality of signals including information about a location of the electronic device 100 are received, the processor 120 may set priority and determine a location of the electronic device 100 according to the set priority or determine a location of the electronic device 100 by combining the plurality of signals. For example, when the processor 120 receives information received from a BLE beacon, Wi-Fi SSID information, and cell-ID information, the processor 120 may determine a location of the electronic device 100 based on the information received from the BLE beacon, the Wi-Fi SSID information, and the cell-ID information in order. However, a signal or information received by the processor 120 is not limited thereto. For example, when a plurality of signals including information about a plurality of locations of the electronic device 100 are received, the processor 120 may measure a location of the electronic device 100 based on information (or a signal) in an order of having higher accuracy for measurement of a location of the electronic device 100. As another example, the processor 120 may measure a location of the electronic device 100 based on information in an order of having a wider range for measurement of a location of the electronic device 100. As another example, when information about a plurality of locations of the electronic device 100 is received, the processor 120 may determine a signal for measurement of a location of the electronic device 100 based on a user input.

According to an embodiment, the processor 120 may receive position information of the electronic device 100 besides information received from a BLE beacon, a GPS signal, Wi-Fi SSID information, and a cell-ID through various communication units.

According to another embodiment, the processor 120 may receive information about a location of the user through the sensor unit 180. For example, the processor 120 may measure a location of the user, e.g., a location of the user close to the electronic device 100, through a signal received from at least one of a gesture sensor, an atmospheric sensor, a grip sensor, a proximity sensor, a biometric sensor, a temperature/humidity sensor, an illumination sensor, and a UV sensor.

According to another embodiment, when the situation information is information about the number of people located around the electronic device 100, the processor 120 may confirm the number of people located around the electronic device 100 by using the camera unit 170 and station (STA) information included in a Wi-Fi beacon.

According to another embodiment, when the situation information is information about a type of the electronic device 100, the processor 120 may confirm a device type of the electronic device 100 through unique device identification information or the like. According to an embodiment, the processor 120 may determine whether the electronic device 100 is a mobile device. For example, when the electronic device 100 is a mobile phone, a wearable electronic device, or the like, the processor 120 may confirm that the electronic device 100 is a mobile device. As another example, when the electronic device 100 is a desktop PC or the like, the processor 120 may confirm that the electronic device 100 is a non-mobile stationary electronic device.

According to another embodiment, when the situation information is information about an internal configuration of the electronic device 100, the processor 120 may confirm software/hardware information of the electronic device 100, such as an OS for operating the electronic device 100, a CPU, a GPU, the communication unit 160, or the like. According to an embodiment, the processor 120 may confirm an application being run in at least one of a foreground and a background of the electronic device 100. According to another embodiment, the processor 120 may confirm a size of the display 150.

According to another embodiment, the situation information may be information about whether a user for whom user authentication is performed corresponds to the user of the electronic device 100. For example, when content requires log-in for an execution thereof, the processor 120 may confirm whether a user for whom user authentication is performed corresponds to the user of the electronic device 100 by checking whether logged-in (or registered) user information matches user information identified through a SIM card included in (or attached to) the electronic device 100.

However, the situation information is not limited thereto, and information about an ambient environment of the electronic device 100 may include, for example, weather information, temperature information, humidity information, illumination information, noise information, and sound information as environment information within a certain radius from the electronic device 100.

According to an embodiment, operation 207 may be omitted. For example, when it is set to perform an iris authentication based on an authentication level set to content of which execution has been requested regardless of the situation information, the processor 120 may not confirm the situation information.

In operation 209, the processor 120 may perform an iris authentication based on an authentication level preset to content. According to an embodiment, to perform an authentication on an iris based on an authentication level preset to content, the processor 120 may compare an iris region in an image acquired through the camera unit 170 with the authentication level preset to the content of which execution has been requested, for example, a threshold value for an iris region, which has been preset to the content of which execution has been requested, and determine whether to re-photograph the iris according to the comparison result.

According to another embodiment, to perform an authentication on an iris based on an authentication level preset to content, the processor 120 may compare iris information (or iris code) generated from an iris image in an iris region with pre-registered iris information (or iris code), determine that user authentication is successful if a degree of similarity between the generated iris information and the pre-registered iris information is equal to or greater than the authentication level preset to the content, for example, a threshold value for the degree of similarity between the generated iris information and the pre-registered iris information, and determine that the user authentication fails if the degree of similarity between the generated iris information and the pre-registered iris information is less than the threshold value.

According to an embodiment, the processor 120 may perform an iris authentication based on the authentication level confirmed for the content and the situation information. According to an embodiment, to perform the iris authentication based on the authentication level confirmed for the content and the situation information, the processor 120 may check an authentication level of the content, which is set (or adjusted) according to the situation information. According to an embodiment, an authentication level of the content may be maintained according the situation information.

Referring to FIGS. 3 and 4, for example, when content of which execution has been requested is the unlock function of the electronic device 100, and a location of the electronic device 100 is home, an authentication level preset to the content may be 50% (or less). When the electronic device 100 is located at a company (or moves to the company), the processor 120 may change the authentication level of the content from 50% (or less) to 80% (or more). As another example, when the content is the unlock function of the electronic device 100, and the number of users (people) around the electronic device 100 is zero, the authentication level of the content may be 60% (or about 60%). When the number of users (people) around the electronic device 100 changes to one or more, the processor 120 may change the authentication level of the content from 60% (or about 60%) to 70% (or more). As another example, when the content is the unlock function of the electronic device 100, and a type of the electronic device 100 is a smartphone, the authentication level of the content may be 80% (or more). When the type of the electronic device 100 changes to a television (TV), e authentication level of the content may be set from 80% (or more) to 50% (or more).

As another example, when the situation information changes in the same manner, the processor 120 may relatively adjust an authentication level according to content. For example, when a location of the electronic device 100 changes from home to a company, the processor 120 may set an authentication level with respect to the unlock function of the electronic device 100 to increase from 50% (or less) to 80% (or more) and set an authentication level with respect to the confidential document display function of the electronic device 100 to decrease from 95% (or more) to 70% (or less).

According to an embodiment, the processor 120 may set an authentication level of content according to whether a user for whom user authentication is performed corresponds to the user of the electronic device 100. For example, when the content requires log-in (or registration) for execution thereof, the processor 120 check whether logged-in (or registered) user information matches user information identified through a SIM card included in (or attached to) the electronic device 100. If it is confirmed that the logged-in user information does not match the identified user information, the processor 120 may set the authentication level of the content to be high.

Although it has been described with reference to FIG. 2 that the user authentication is performed by the electronic device 100, according to an embodiment, the user authentication may be performed by the server 108. For example, when a user input for execution of content is received, the processor 120 may request the server 108 for the user authentication. In detail, when a user input for execution of content is received, the electronic device 100 may transmit information corresponding to the received user input to the server 108 which provides a content service. The server 108 may check whether the content requires iris authentication based on the received information and confirm an authentication level of the content. According to an embodiment, the server 108 may perform the iris authentication based on the confirmed authentication level. According to another embodiment, when the server 108 receives situation information from the electronic device 100, the server 108 may set the confirmed authentication level based on the received situation information. The server 108 may perform the iris authentication based on the set authentication level. According to an embodiment, when the user authentication is performed by the server 108, authentication levels of content may be stored in the database of the server 108 in a table form. According to an embodiment, the electronic device 100 may receive a user authentication result from the server 108 and output the user authentication result.

Figure 5:
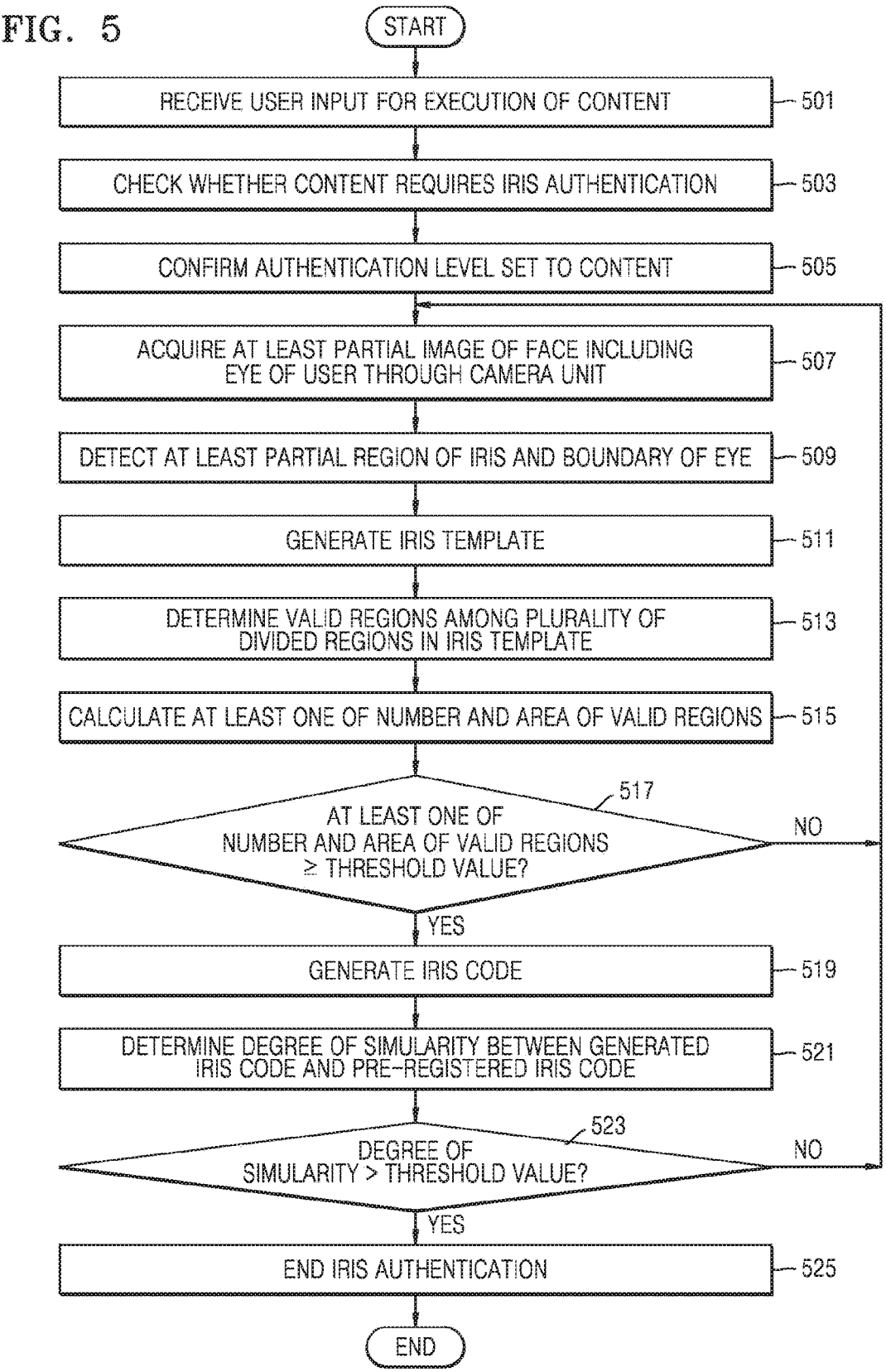
FIG. 5 illustrates a flowchart of a user authentication method according to an embodiment of the present disclosure.

FIG. 5 illustrates a flowchart of a user authentication method according to an embodiment of the present disclosure.

Figure 6A:
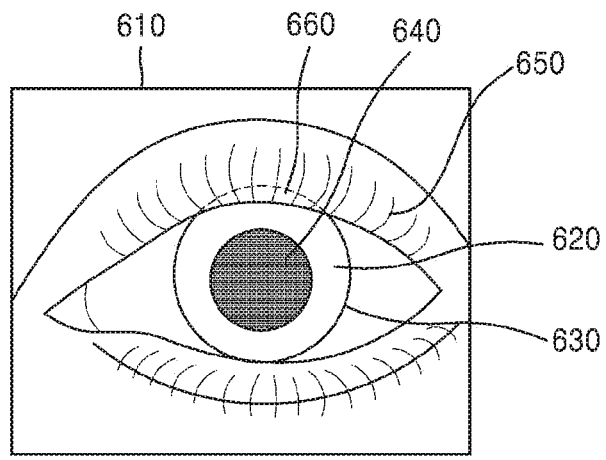
FIG. 6A illustrates an iris authentication related diagram for describing the user authentication method of FIG. 5 according to an embodiment of the present disclosure.
Figure 6B:
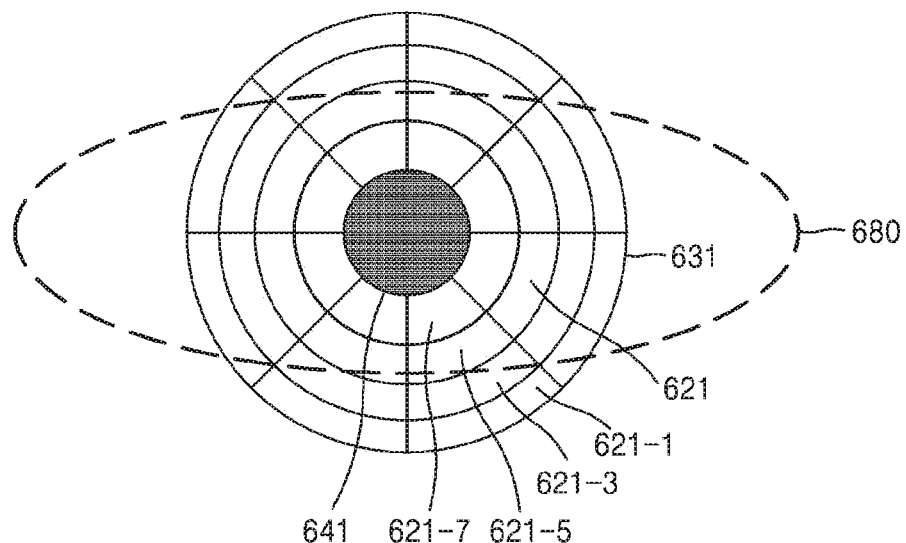
FIG. 6B illustrates an iris authentication related diagram for describing the user authentication method of FIG. 5 according to an embodiment of the present disclosure.

FIGS. 6A and 6B illustrate iris authentication related diagrams for describing the user authentication method of FIG. 5 according to various embodiments of the present disclosure.

Figure 7A:
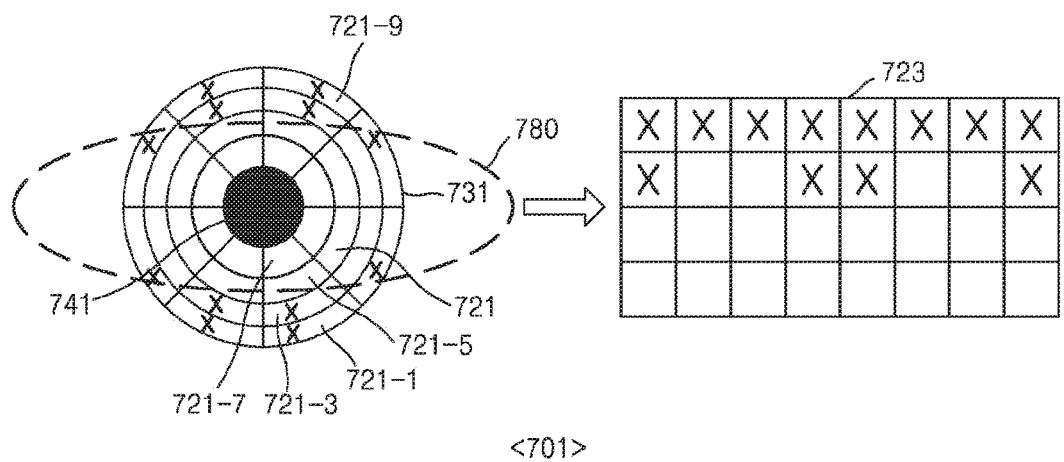
FIG. 7A illustrates an iris authentication related diagram for describing the user authentication method of FIG. 5 according to an embodiment of the present disclosure.
Figure 7B:
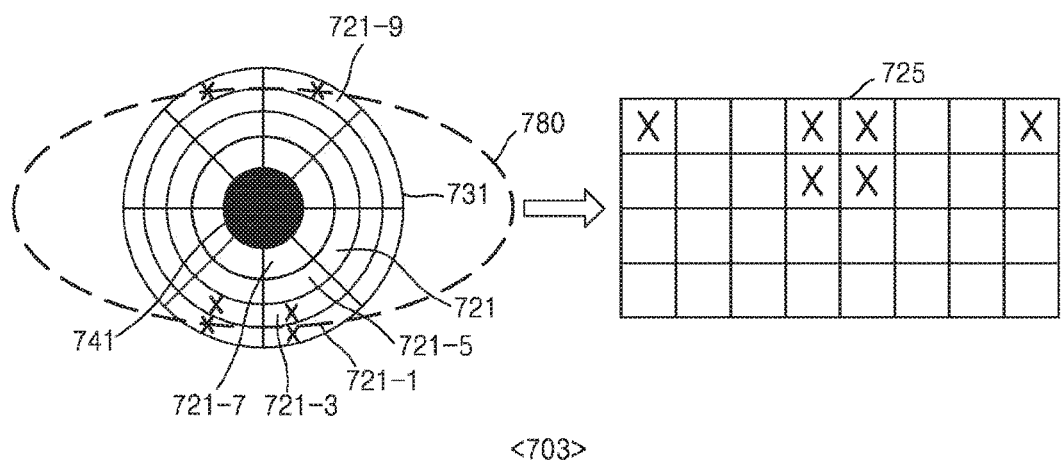
FIG. 7B illustrates an iris authentication related diagram for describing the user authentication method of FIG. 5 according to an embodiment of the present disclosure.

FIGS. 7A and 7B illustrate iris authentication related diagrams for describing the user authentication method of FIG. 5 according to an embodiment of the present disclosure.

Referring to FIGS. 5, 6A, 6B, 7A, and 7B, in operation 501, the processor 120 may receive a user input for an execution of content. In operation 503, the processor 120 may check whether the content requires iris authentication, based on the user input for an execution of the content, which has been received through the input unit 140. If it is confirmed in operation 503 that the content requires iris authentication, the processor 120 may confirm an authentication level set to the content in operation 505. Operations 501, 503, and 505 are the same as operations 201, 203, and 205 of FIG. 2, respectively, and thus a detailed description thereof is omitted.

In operation 507, the processor 120 may acquire at least a partial image of a face including an eye of the user (hereinafter, also used as "appearance image") through the camera unit 170. According to an embodiment, the camera unit 170 may include an IRED, an IR camera unit, a visible light camera unit, a module for converting an analog image into a digital image, and the like to acquire a clear image. According to an embodiment, when an image of the user is received from the camera unit 170, the processor 120 may extract a face region of the user based on the received image. For example, the processor 120 may extract the face region of the user by using an algorithm such as a knowledge-based method, a feature-based method, a template matching method, or an appearance-based method. However, a method of extracting the face region of the user is not limited thereto, and various methods may be used therefor.

According to an embodiment, when the image of the user is received from the camera unit 170, the processor 120 may extract an eye region of the user. For example, the processor 120 may extract the eye region of the user by using an eye region extraction algorithm. However, the operation of extracting the face region of the user and the operation of extracting the eye region of the user may be omitted according to embodiments. For example, when a zoom-in function is used in a preview state, or when the user performs photographing in a state in which the eye of the user is included in a preview image by moving a location of the face including the eye, the operation of extracting the face region of the user and the operation of extracting the eye region of the user may be omitted.

According to an embodiment, as shown in an image 610 of FIG. 6A, the image 610 including the eye of the user may include a partial region 620 of an iris which is not hidden by an eyelid and eyelashes 650, a boundary 630 between the iris and a sclera, a pupil region 640, and a partial region 660 of the iris which is hidden by the eyelid.

In operation 509, the processor 120 may detect a partial region of the iris and a boundary of the eye based on the acquired at least the partial image of the face including the eye of the user, i.e., the appearance image.

For example, the processor 120 may detect the partial region of the iris based on the acquired appearance image by using an algorithm such as an Integro-differential operator algorithm, a Hough transform algorithm, a discrete cosine transform algorithm, a bisection method, or a black hole search method. According to an embodiment, when the partial region of the iris is hidden by the eyelid, the processor 120 may detect the partial region of the iris and the boundary of the eye by using, for example, texture segmentation or a Daubechies wavelets method. According to an embodiment, when the partial region of the iris is hidden by the eyelid, the processor 120 may detect the partial region of the iris and the boundary of the eye by using a Gabor filter and variance of intensity and combination of both edge and region information.

In operation 511, the processor 120 may generate an iris template 621 or 721 based on at least the partial region of the iris, which has been detected in operation 509. According to an embodiment, the processor 120 may generate the iris template 621 or 721 including a plurality of divided regions 621-1 through 621-7 or 721-1 through 721-9. For example, as shown in an image 603 of FIG. 6B and images 701 and 703 of FIGS. 7A and 7B, the processor 120 may generate the iris template 621 or 721 such that the iris template 621 or 721 includes the plurality of divided regions 621-1 through 621-7 or 721-1 through 721-9 having a preset area of a preset number. According to an embodiment, the iris template 621 or 721 may be generated with a size corresponding to a size of the detected partial region of the iris. For example, the processor 120 may generate the iris template 621 or 721 having a size such that the boundary 630 between the partial region of the iris, which has been detected in operation 509, and a sclera region matches an outer boundary 631 or 731 of the iris template 621 or 721. As another example, the processor 120 may generate the iris template 621 or 721 such that a boundary of a pupil matches am inner boundary 641 or 741 of the iris template 621 or 721.

According to an embodiment, areas or the number of the plurality of divided regions 621-1 through 621-7 or 721-1 through 721-9 included in the iris template 621 or 721 may be set by the user or by an intention of a designer in a design. For example, although it is shown in the image 603 that each of the iris templates 621 and 721 includes 32 divided regions, the processor 120 may generate the iris templates 621 and 721 such that each of the iris templates 621 and 721 include 15, 7, 4, or 2 divided regions. As another example, the processor 120 may generate the iris templates 621 and 721 such that areas of the plurality of divided regions 621-1 through 621-7 or 721-1 through 721-9 differ from each other. However, the iris templates 621 and 721 are not limited thereto, and the processor 120 may generate the iris templates 621 and 721 such that each of the iris templates 621 and 721 includes at least one of the number and an area of various divided regions.

According to an embodiment, as shown in the image 603 of FIG. 6B, the processor 120 may generate an eye boundary 680 in a form in which a broken line forming an oval is not distorted, based on the boundary of the eye, which is extracted in operation 509. The processor 120 may generate the eye boundary 680 so as to match the boundary of the eye, which has been extracted in operation 509.

In operation 513, the processor 120 may determine valid regions corresponding to the iris region from among the plurality of divided regions 621-1 through 621-7 or 721-1 through 721-9 included in the iris template 621 or 721. According to an embodiment, the valid regions are to extract an iris pattern and may be included in a region formed by an eye boundary 680 or 780 among the plurality of divided regions 621-1 through 621-7 or 721-1 through 721-9 included in the iris template 621 or 721. For example, in the image 701 of FIG. 7A, the valid regions may correspond to divided regions except for the divided regions marked with "x" 721-1, 721-3, and 721-9 in the iris template 721. As another example, in the image 703 of FIG. 7B, the valid regions may correspond to the divided regions except for divided regions marked with "x" 721-1, 721-3, and 721-9 in the iris template 721. According to an embodiment, the processor 120 may determine that the divided region 621-1 or 721-1 crossing the eye boundary 680 or 780 among the divided regions in the iris template 621 or 721 is a valid region or an invalid region according to a configuration. For example, the processor 120 may determine that the divided region 621-1 or 721-1 crossing the eye boundary 680 or 780 among the divided regions in the iris template 621 or 721 is an invalid region, and determine that only divided regions included in a region formed by the eye boundary 680 or 780 are valid regions. As another example, the processor 120 may determine that the divided region 621-1 or 721-1 crossing the eye boundary 680 or 780 among the divided regions in the iris template 621 or 721 is a valid region according to at least one of the divided regions in the iris template 621 or 721.

In operation 515, the processor 120 may calculate at least one of the number and an area of valid regions, which is set as a reference for the iris authentication, based on the determined valid regions. For example, when it is set that the iris authentication is performed based on the number of valid regions, the processor 120 may calculate the number of valid regions. As another example, when it is set that the iris authentication is performed based on the number and an area of valid regions, the processor 120 may calculate the number and the area of valid regions.

According to an embodiment, the processor 120 may calculate the number of valid regions as 20 by excluding 12 invalid regions marked with "x" from 32 divided regions in the iris template 721 of the image 701. The processor 120 may calculate the number of valid regions as 26 by excluding 6 invalid regions marked with "x" from 32 divided regions in the iris template 721 of the image 703. As another example, the processor 120 may calculate an area of the 20 valid regions by excluding the 12 invalid regions marked with "x" from the 32 divided regions in the iris template 721 of the image 701. The processor 120 may calculate an area of the 26 valid regions by excluding the 6 invalid regions marked with "x" from the 32 divided regions in the iris template 721 of the image 703.

In operation 517, the processor 120 may determine whether at least one of the calculated number of valid regions and the calculated area of the valid regions is equal to or greater than the authentication level set to the content of which execution has been requested, e.g., a threshold value for an iris region. For example, when it is set that the reference for the iris authentication is set as the number of valid regions, the processor 120 may determine whether the number of valid regions, which has been calculated in operation 515, is a threshold division number or more. As another example, when it is set that the reference for the iris authentication is set as an area of valid regions, the processor 120 may determine whether the area of valid regions, which has been calculated in operation 515, is a threshold area or more. As another example, when it is set that the reference for the iris authentication is set as the number of valid regions and an area of the valid regions, the processor 120 may determine whether the number and area of valid regions, which are calculated in operation 515, are the threshold division number and the threshold area or more, respectively.

According to an embodiment, the processor 120 may transform the iris template 721 into a standardized iris template 723 or 725. The iris template 621 or 721 may have a different size according to a size of an iris. For example, a size of the iris template 721 in the image 701 may differ from a size of the iris template 721 in the image 703. The processor 120 may transform the iris template 721 into the standardized iris template 723 or 725 having the same number of divided regions as the iris template 721 and a determined size (or area) in order to compare at least one of the number and area of valid regions with the threshold value for an iris region. For example, as shown in the right of each of the images 701 and 703, the processor 120 may transform the iris template 721 into the standardized iris template 723 or 725 having the same number of divided regions as the iris template 721 and the determined size (or area).

According to an embodiment, the processor 120 may set the authentication level set to the content of which execution has been requested, e.g., the threshold value for an iris region, to vary according to content. For example, the processor 120 may set a threshold value for an iris region with respect to an application for a financial transaction (e.g., an account inquiry, an account transfer, or a securities transaction) to be higher than a threshold value for an iris region with respect to an application for a video playback. As another example, when content includes electronic documents of the same type (or format), a threshold value for an iris region may be differently set according to a degree of requiring security. That is, a threshold value for an iris region with respect to a document requiring security may be set to be higher than a threshold value for an iris region with respect to a document which does not require security. As another example, for photograph files of the same type, a threshold value for an iris region with respect to a photograph file requiring private protection (security) may be set to be higher than a threshold value for an iris region with respect to a photograph file which does not require private protection.

According to an embodiment, if the processor 120 has determined in operation 517 that the at least one of the number and area of valid regions, which is set as the reference for the iris authentication, is less than the threshold value for an iris region, the processor 120 may return to operation 507. For example, when the number of valid divided regions in the iris template 621 or 721 is less than the threshold value, the processor 120 may control the camera unit 170 to re-photograph the user (or the iris of the user).

If the processor 120 has determined in operation 517 that the at least one of the number and area of valid divided regions, which is set as the reference for the iris authentication, is equal to or greater than the threshold value for an iris region, the processor 120 may generate (or extract) an iris code from the iris image in the iris region in operation 519. For example, the processor 120 may generate (or extract) an iris code based on the standardized iris template 723 or 725. For example, the processor 120 may convert an iris pattern included in the standardized iris template 723 or 725 into a value on a polar coordinate system. According to an embodiment, the processor 120 may convert the iris pattern included in the standardized iris template 723 or 725 into a value (or vector value) including a direction component on the polar coordinate system. According to an embodiment, the processor 120 may normalize the converted iris pattern. According to an embodiment, the processor 120 may generate an iris code obtained by encoding the iris pattern from the normalized iris pattern. For example, the processor 120 may generate a (iris) code from the normalized iris pattern by using an algorithm such as a Gabor filter algorithm, a wavelet transform algorithm, a Laplacian of Gaussian filter algorithm, a key local variations algorithm, a Hilbert transform algorithm, or a discrete cosine transform algorithm. However, the algorithm for generating an iris pattern as an iris code is not limited thereto, and all algorithms for generating an iris pattern as an iris code may be applicable. According to an embodiment, the conversion of the iris pattern included in the standardized iris template 723 or 725 into a value on the polar coordinate system and the normalization of the iris pattern are only illustrations for generating an iris code, and the conversion and the normalization of the iris pattern may be omitted according to an algorithm applied to generate the iris code.

According to an embodiment, the processor 120 may generate an iris code based on the at least a partial region of the iris, which has been detected in operation 509 without based on the standardized iris template 723 or 725. For example, the processor 120 may perform polar coordinate system conversion, normalization, and code generation on an iris pattern included in the detected at least a partial region of the iris (or an image of the at least a partial region of the iris) without generating the standardized iris template 723 or 725.

According to an embodiment, the processor 120 may generate an iris code based on an iris pattern included in only valid regions in the iris template 621 or 721. For example, the processor 120 may generate an iris code only based on an iris pattern included in valid regions except for invalid divided regions in the iris template 621 or 721.

In operation 521, the processor 120 may determine a degree of similarity (or a degree of matching) between the generated iris code and a pre-registered (or reference) iris code by comparing the generated iris code with the pre-registered iris code. For example, the processor 120 may determine a degree of similarity between the generated iris code and the pre-registered iris code by using an algorithm such as a Hamming distance algorithm, a weighted Euclidean distance algorithm, a normalized correlation algorithm, or a nearest feature line algorithm. However, the algorithm for determining a degree of similarity is not limited thereto, and all algorithms capable of comparing the generated iris code and the pre-registered iris code may be applicable.

In operation 523, the processor 120 may determine whether the degree of similarity between the generated iris code and the pre-registered iris code is equal to or greater than an authentication level, e.g., a threshold value for a degree of similarity between a generated iris code and the pre-registered iris code. According to an embodiment, the processor 120 may set a threshold value for a degree of similarity between an iris code and the pre-registered iris code for each piece of content. For example, the processor 120 may set a threshold value for a degree of similarity with respect to an application for a financial transaction (e.g., account inquiry, an account transfer, or a securities transaction) to be higher than a threshold value for a degree of similarity with respect to an application for a video playback. As another example, when content includes electronic documents of the same type (or format), a threshold value for a degree of similarity may be differently set according to a degree of requiring security. That is, a threshold value for a degree of similarity with respect to a document requiring security may be set to be higher than a threshold value for a degree of similarity with respect to a document which does not require security. As another example, for photograph files of the same type (or format), a threshold value for a degree of similarity with respect to a photograph file requiring private protection may be set to be higher than a threshold value for a degree of similarity with respect to a photograph file which does not require private protection.

If the processor 120 has determined in operation 523 that the degree of similarity between the generated iris code and the pre-registered iris code is less than the threshold value, the processor 120 may return to operation 507. For example, if it is determined that the degree of similarity between the generated iris code and the pre-registered iris code is less than the threshold value, the processor 120 may control the camera unit 170 to re-photograph an appearance image.

If the processor 120 has determined in operation 523 that the degree of similarity between the generated iris code and the pre-registered iris code is equal to or greater than the threshold value, the processor 120 may determine that the iris authentication is successful and end the iris authentication by executing the content of which execution has been requested in operation 525.

Figure 8:
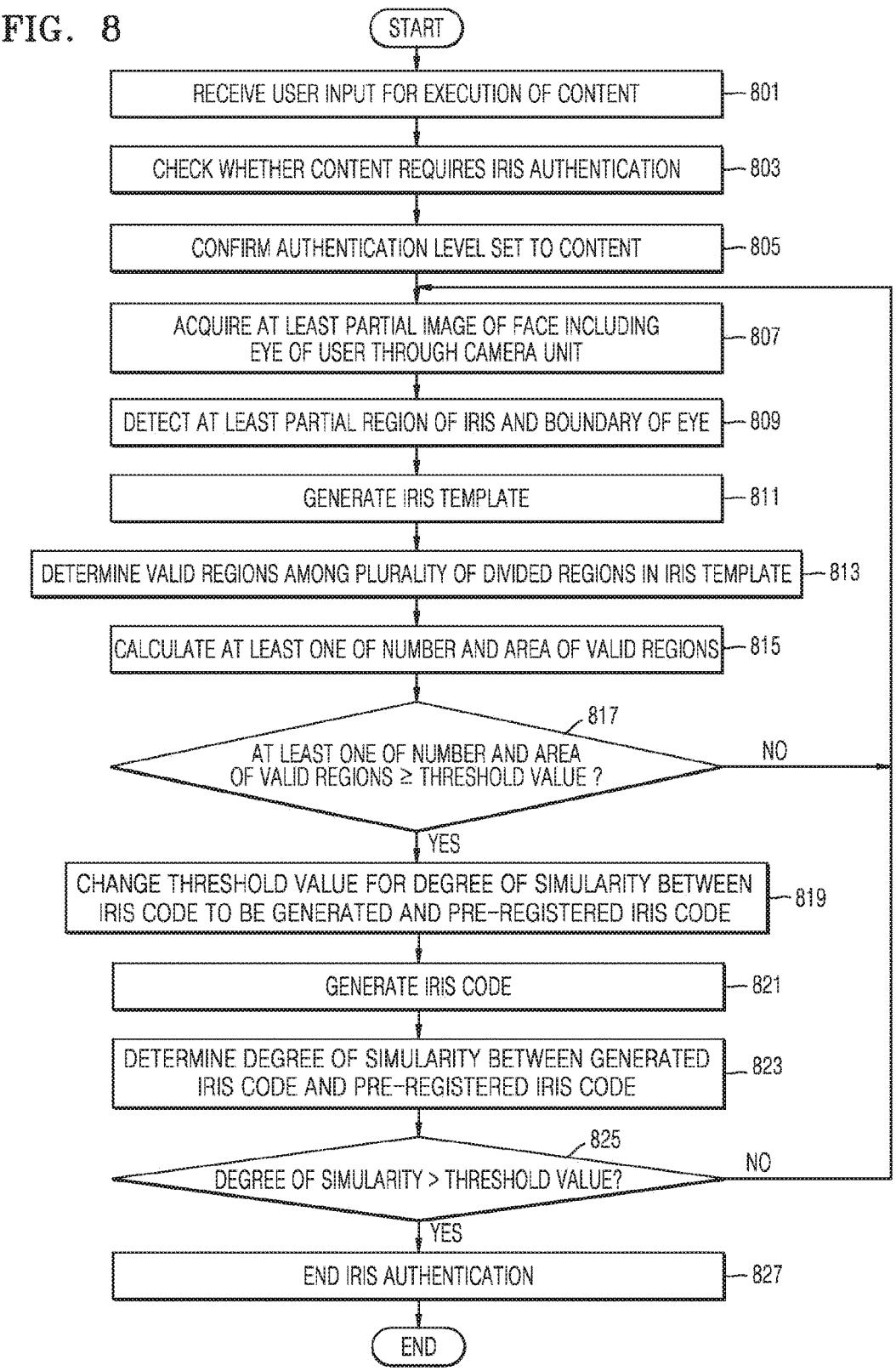
FIG. 8 illustrates a flowchart of a user authentication method according to an embodiment of the present disclosure.

FIG. 8 illustrates a flowchart of a user authentication method according to an embodiment of the present disclosure.

Figure 9A:
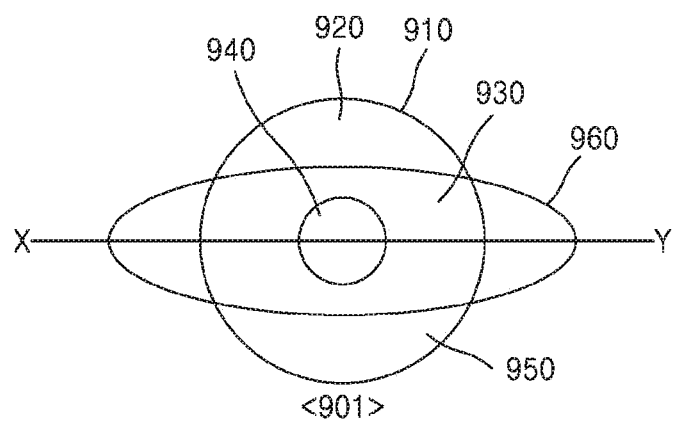
FIG. 9A illustrates an iris authentication related diagram for describing the user authentication method of FIG. 8 according to an embodiment of the present disclosure.
Figure 9B:
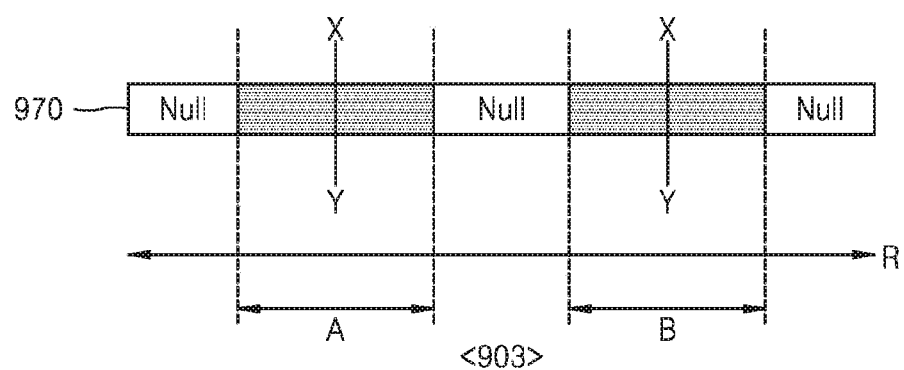
FIG. 9B illustrates an iris authentication related diagram for describing the user authentication method of FIG. 8 according to an embodiment of the present disclosure.

FIGS. 9A and 9B illustrate iris authentication related diagrams for describing the user authentication method of FIG. 8 according to an embodiment of the present disclosure.

Referring to FIGS. 8, 9A, and 9B, in operation 801, the processor 120 may receive a user input for an execution of content through the input unit 140. In operation 803, the processor 120 may check whether the content requires iris authentication, based on the received user input for an execution of the content. If it is confirmed in operation 803 that the content requires iris authentication, the processor 120 may confirm an authentication level set to the content in operation 805. In operation 807, the processor 120 may acquire at least a partial image of a face including an eye of the user (i.e., an appearance image) through the camera unit 170. In operation 809, the processor 120 may detect a partial region of the iris and a boundary of the eye based on the acquired appearance image. In operation 811, the processor 120 may generate an iris template based on at least the partial region of the iris, which has been detected in operation 809. In operation 813, the processor 120 may determine valid regions from among a plurality of divided regions in the iris template. In operation 815, the processor 120 may calculate at least one of the number and an area of valid regions, which is set as a reference for the iris authentication, based on the determined valid regions. In operation 817, the processor 120 may determine whether at least one of the calculated number of valid regions and the calculated area of the valid regions is equal to or greater than the authentication level set to the content of which execution has been requested, e.g., a threshold value for an iris region. Operations 801 through 817 are the same as operations 501 through 517 of FIG. 5, respectively, and thus a detailed description thereof is omitted.

If the processor 120 has determined in operation 817 that the at least one of the number and area of valid divided regions, which is set as the reference for the iris authentication, is equal to or greater than the threshold value for an iris region, the processor 120 may change a threshold value for a degree of similarity between an iris code to be generated based on the iris template with a pre-registered iris code according to the at least one of the number and area of valid divided regions in operation 819. For example, the processor 120 may compare the area of the valid regions among the plurality of divided regions in the iris template with a determined value and change the threshold value for a degree of similarity between an iris code to be generated based on the iris template with the pre-registered iris code according to the comparison result. An image 901 of FIG. 9A shows an iris template 910 and an eye boundary 960 according to an X-Y axis. In the image 901, the iris template 910 may include invalid divided regions 920 and 950 outside the eye boundary 960, a valid region 930, and an invalid divided region 940 corresponding to a pupil. In FIG. 9B, an image 903 shows a standardized iris template 970 including valid regions and invalid divided regions (or null regions) according to an axis orthogonal to the X-Y axis.

According to an embodiment, the processor 120 may calculate an area of the valid regions, e.g., an area corresponding to a section A and a section B, among an area of the whole divided regions, e.g., an area corresponding to a section R. According to an embodiment, if a ratio of the area of the valid regions to the area of the whole divided regions is the determined value, e.g., 0.8, or more, the processor 120 may change the threshold value for a degree of similarity between an iris code to be generated with the pre-registered iris code to decrease, for example from 80% to 70%. According to another embodiment, if the ratio of the area of the valid regions to the area of the whole divided regions is less than the determined value, e.g., 0.8, the processor 120 may change the threshold value for a degree of similarity between an iris code to be generated with the pre-registered iris code to increase, for example from 80% to 90%.

Although not shown in FIGS. 9A and 9B, as another example, the processor 120 may compare the number of valid regions among the plurality of divided regions in the iris template with the determined value and change the threshold value for a degree of similarity between an iris code to be generated based on the iris template, which is set to the content for which execution has been requested, with the pre-registered iris code according to the comparison result. For example, the processor 120 may calculate the total number of the plurality of divided regions in the iris template as C, the number of valid regions as D, and the number of invalid regions as E. According to an embodiment, if a ratio of the number D of valid regions to the total number C of divided regions is equal to or greater than the determined value, e.g., 0.7, the processor 120 may change the threshold value for a degree of similarity between an iris code to be generated with the pre-registered iris code to decrease, for example from 80% to 70%. According to another embodiment, if the ratio of the number D of valid regions to the total number C of divided regions is less than the determined value, e.g., 0.7, the processor 120 may change the threshold value for a degree of similarity between an iris code to be generated with the pre-registered iris code to increase, for example from 80% to 90%.

In operation 821, the processor 120 may generate an iris code based on the standardized iris template 970. In operation 823, the processor 120 may determine a degree of similarity (or a degree of matching) between the generated iris code and a pre-registered (or reference) iris code for the user by comparing the generated iris code with the pre-registered iris code. Operations 821 and 823 are the same as operations 519 and 521 of FIG. 5, respectively, and thus a detailed description thereof is omitted.

In operation 825, the processor 120 may determine whether the degree of similarity between the generated iris code and the pre-registered iris code is equal to or greater than an authentication level, e.g., the changed threshold value for a degree of similarity between a generated iris code and the pre-registered iris code.

If the processor 120 has determined in operation 825 that the degree of similarity between the generated iris code and the pre-registered iris code is less than the changed threshold value, the processor 120 may return to operation 807. For example, if it is determined that the degree of similarity between the generated iris code and the pre-registered iris code is less than the changed threshold value, the processor 120 may control the camera unit 170 to re-photograph an appearance image.

If the processor 120 has determined in operation 825 that the degree of similarity between the generated iris code and the pre-registered iris code is equal to or greater than the changed threshold value, the processor 120 may determine that the iris authentication is successful and end the iris authentication by executing the content of which execution has been requested in operation 827.

Figure 10:
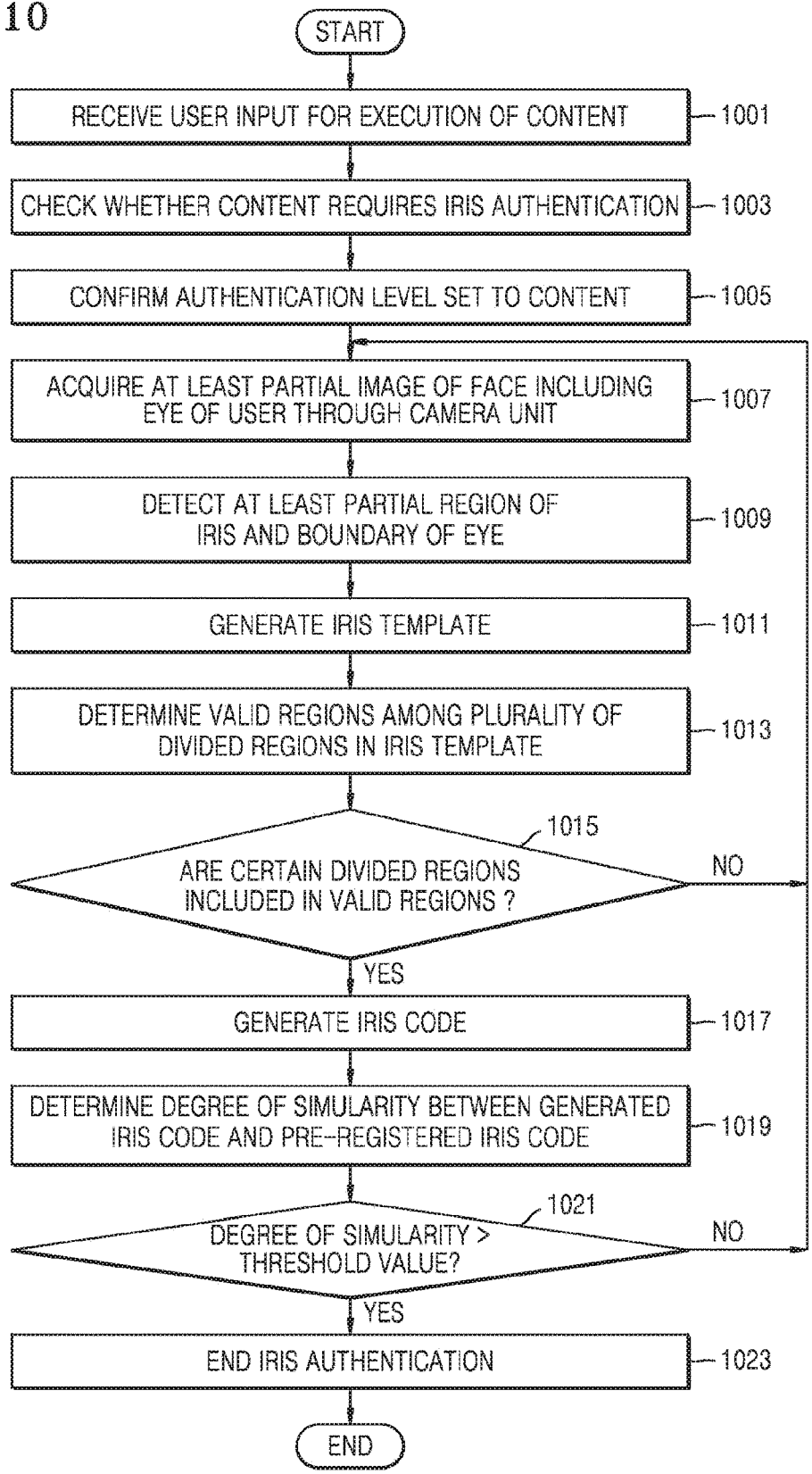
FIG. 10 illustrates a flowchart of a user authentication method according to an embodiment of the present disclosure.

FIG. 10 illustrates a flowchart of a user authentication method according to an embodiment of the present disclosure.

Figure 11A:
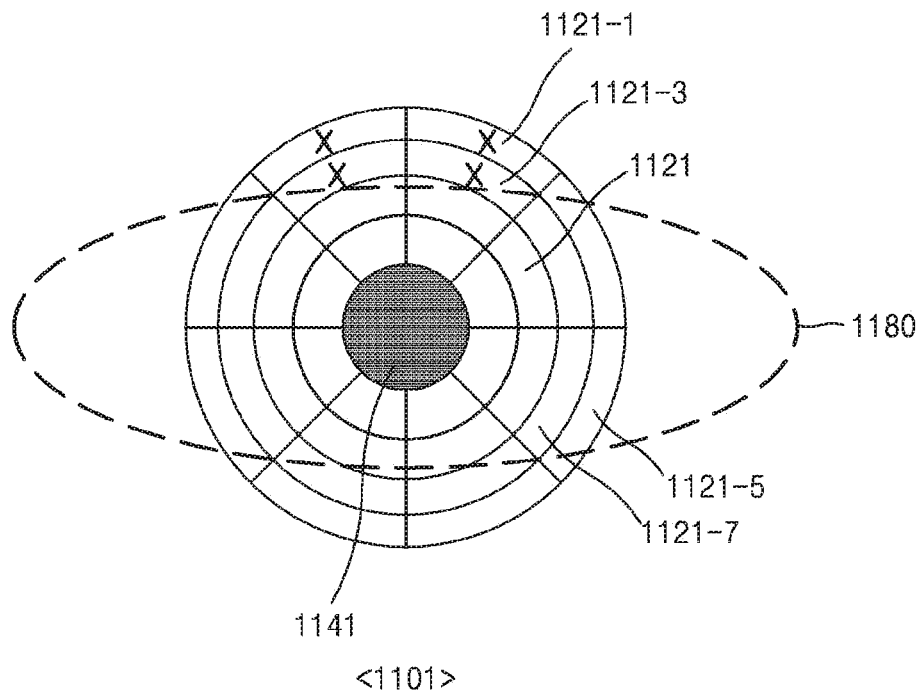
FIG. 11A illustrates an iris authentication related diagram for describing the user authentication method of FIG. 10 according to an embodiment of the present disclosure.
Figure 11B:
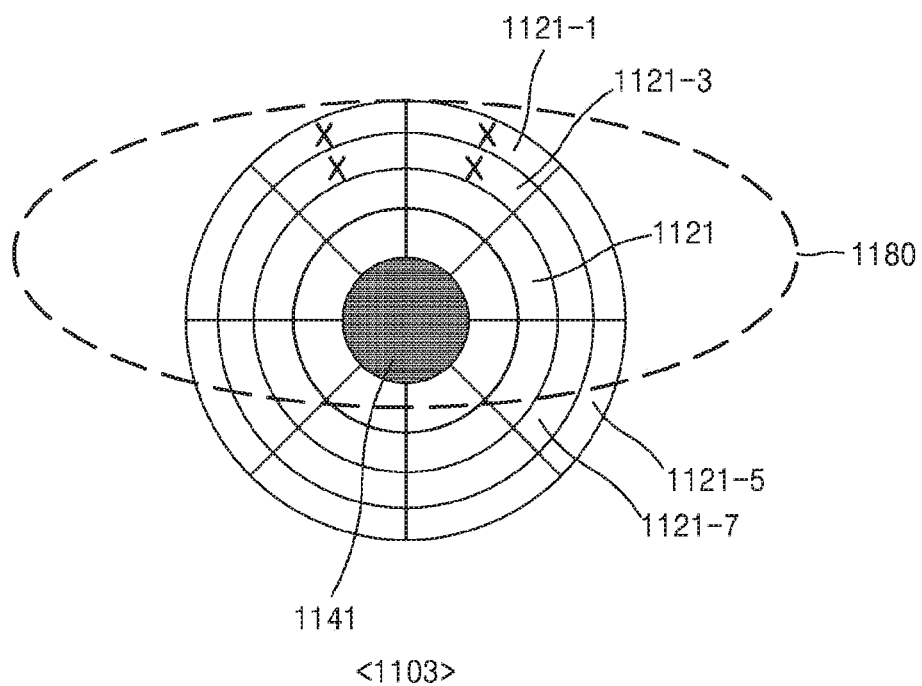
FIG. 11B illustrates an iris authentication related diagram for describing the user authentication method of FIG. 10 according to an embodiment of the present disclosure.

FIGS. 11A and 11B illustrate iris authentication related diagrams for describing the user authentication method of FIG. 10 according to an embodiment of the present disclosure.

Referring to FIGS. 10, 11A, and 11B, in operation 1001, the processor 120 may receive a user input for an execution of content. In operation 1003, the processor 120 may check whether the content requires iris authentication, based on the user input for an execution of the content, which has been received through the input unit 140. If it is confirmed in operation 1003 that the content requires iris authentication, the processor 120 may confirm an authentication level set to the content in operation 1005. In operation 1007, the processor 120 may acquire at least a partial image of a face including an eye of the user, i.e., an appearance image, through the camera unit 170. In operation 1009, the processor 120 may detect a partial region of the iris and a boundary of the eye based on the acquired appearance image. In operation 1011, the processor 120 may generate an iris template based on at least the partial region of the iris, which has been detected in operation 1009. In operation 1013, the processor 120 may determine valid regions from among a plurality of divided regions in the iris template. Operations 1001 through 1013 are the same as operations 501 through 513 of FIG. 5, respectively, and thus a detailed description thereof is omitted.

In operation 1015, the processor 120 may determine whether the valid regions in the iris template 1121 include certain divided regions (or a certain region). According to an embodiment, the processor 120 may determine whether an iris region outside of pupil 1141 in the acquired image includes regions corresponding to preset certain regions. According to an embodiment, the certain regions may be upper, lower, left, or right certain regions of the iris. According to an embodiment, the certain divided regions may be divided regions corresponding to positions designated for iris authentication. When comparing images 1101 and 1103 of FIGS. 11A and 11B, respectively, regions 1121-1 and 1121-3 marked with "x" in the image 1101 are not included with an eye boundary 1180 and may correspond to invalid divided regions. The regions 1121-1 and 1121-3 marked with "x" in the image 1103 are included with the eye boundary 1180 and may correspond to valid divided regions. For example, if the regions 1121-1 and 1121-3 marked with "x" in the image 1101 are the certain divided regions (or regions set as the certain divided regions), even though at least one of the number and area of valid divided regions is equal to or greater than a threshold value for a range of the iris, if the certain divided regions are not included in valid regions, the processor 120 may determine that the valid regions in the iris template do not include the certain divided regions. In this case, the processor 120 may return to operation 1007. For example, if it is determined that the valid regions in the iris template do not include the certain divided regions, the processor 120 may control the camera unit 170 to re-acquire (i.e., re-photograph) at least a partial image of the face including the eye of the user, i.e., an appearance image.

For example, when regions marked with "x" are determined as the certain divided regions, even though at least one of the number and area of valid divided regions is less than the threshold value for the range of the iris in operation 1015, if the certain divided regions are included in the valid regions, the processor 120 may determine that the valid regions in the iris template include the certain divided regions. In this case, the processor 120 may not acquire an appearance image again and may perform an iris authentication process thereafter.

According to an embodiment, the processor 120 may set divided regions 1121-5 and 1121-7 located at an arbitrary position in the iris template as the certain divided regions according to the user's settings or an intention of a designer in a design. For example, the processor 120 may set lower divided regions of the iris template as the certain divided regions.

In operation 1017, the processor 120 may generate an iris code based on the valid regions including the certain divided regions. In operation 1019, the processor 120 may determine a degree of similarity between the generated iris code and a pre-registered iris code by comparing the generated iris code with the pre-registered iris code. In operation 1021, the processor 120 may determine whether the degree of similarity between the generated iris code and the pre-registered iris code is equal to or greater than an authentication level, e.g., a threshold value for a degree of similarity. If the processor 120 has determined in operation 1021 that the degree of similarity between the generated iris code and the pre-registered iris code is less than the threshold value, the processor 120 may return to operation 1007. For example, if it is determined that the degree of similarity between the generated iris code and the pre-registered iris code is less than the threshold value, the processor 120 may control the camera unit 170 to re-photograph at least a partial image of the face including the eye of the user, i.e., an appearance image.

If the processor 120 has determined in operation 1021 that the degree of similarity between the generated iris code and the pre-registered iris code is equal to or greater than the threshold value, the processor 120 may determine that the iris authentication is successful and end the iris authentication by executing the content of which execution has been requested in operation 1023.

Figure 12:
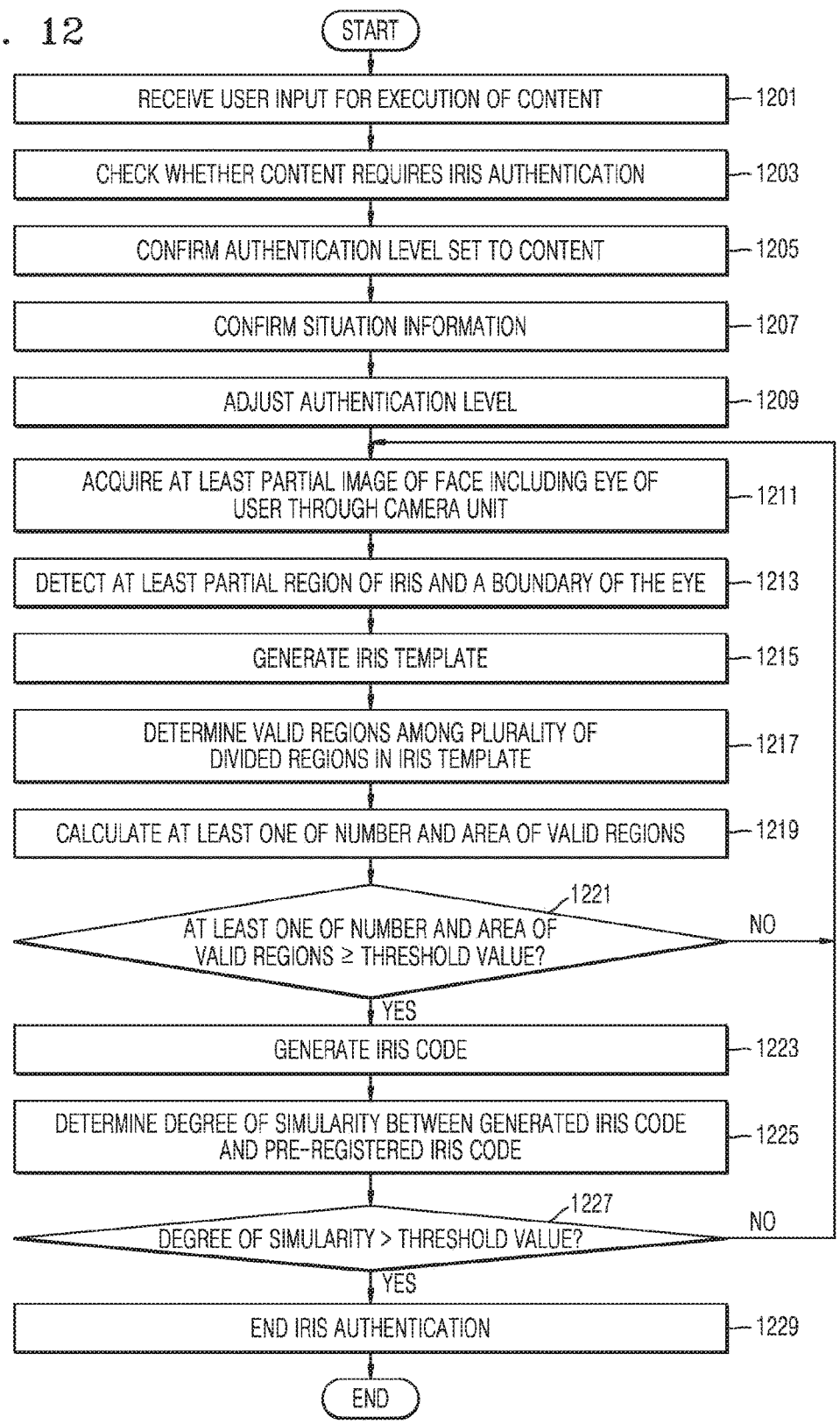
FIG. 12 illustrates a flowchart of a user authentication method according to an embodiment of the present disclosure.
Figure 13A:
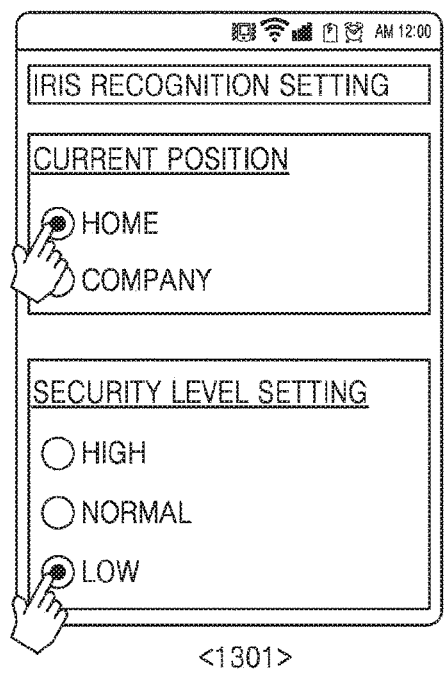
FIGS. 13A-13D illustrate iris authentication related diagrams for describing a user authentication method according to various embodiments of the present disclosure.
Figure 13B:
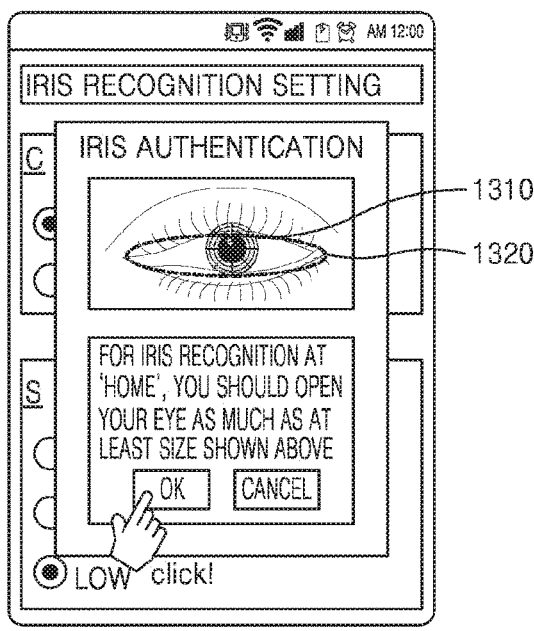
Figure 13C:
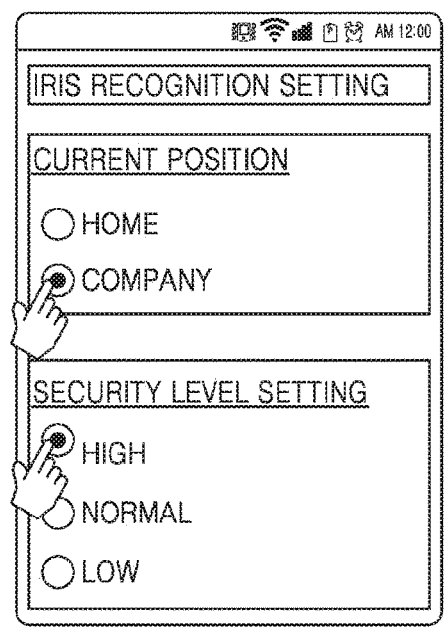
Figure 13D:
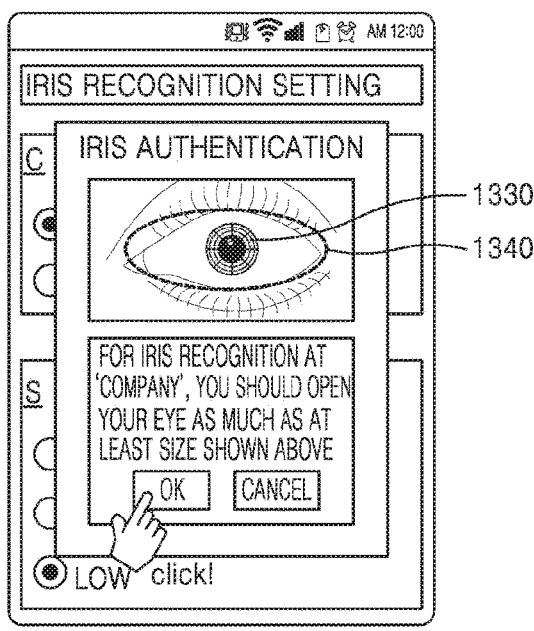

FIG. 12 illustrates a flowchart of a user authentication method according to an embodiment of the present disclosure.

Referring to FIG. 12, in operation 1201, the processor 120 may receive a user input for an execution of content through the input unit 140. In operation 1203, the processor 120 may check whether the content requires iris authentication, based on the received user input for an execution of the content. If it is confirmed in operation 1203 that the content requires iris authentication, the processor 120 may confirm an authentication level set to the content in operation 1205. In operation 1207, the processor 120 may confirm situation information. Operations 1201 through 1207 are the same as operations 201 through 207 of FIG. 2, respectively, and thus a detailed description thereof is omitted.

In operation 1209, the processor 120 may adjust the authentication level set to the content, based on the confirmed situation information. For example, the processor 120 may determine an authentication level to be set (or reset) based on the situation information. According to an embodiment, the processor 120 may adjust the authentication level set to the content, e.g., a threshold value for an iris region, based on the confirmed situation information. For example, when it is determined that the situation information corresponds to a situation requiring higher security than a preset situation, the processor 120 may adjust the threshold value for an iris region to be high. As another example, when it is determined that the situation information corresponds to a situation requiring lower security than the preset situation, the processor 120 may adjust the threshold value for an iris region to be low.

According to another embodiment, the processor 120 may adjust the authentication level set to the content, e.g., a threshold value for a degree of similarity between an iris code generated based on an iris template and a pre-registered iris code, based on the confirmed situation information. For example, the processor 120 may determine an authentication level to be set (or reset) based on the situation information. For example, when it is determined that the situation information corresponds to a situation requiring higher security than the preset situation, the processor 120 may adjust the threshold value for a degree of similarity between an iris code generated based on an iris template and the pre-registered iris code to be high. As another example, when it is determined that the situation information corresponds to a situation requiring lower security than the preset situation, the processor 120 may adjust the threshold value for a degree of similarity between an iris code generated based on an iris template and the pre-registered iris code to be low.

According to another embodiment, the processor 120 may adjust the authentication level set to the content, e.g., at least one of the threshold value for an iris region and the threshold value for a degree of similarity between an iris code generated based on an iris template and the pre-registered iris code, based on the confirmed situation information. For example, when it is determined that the situation information corresponds to a situation requiring higher security than the preset situation, the processor 120 may adjust the threshold value for an iris region and the threshold value for a degree of similarity between an iris code generated based on an iris template and the pre-registered iris code to be high. As another example, when it is determined that the situation information corresponds to a situation requiring lower security than the preset situation, the processor 120 may adjust the threshold value for an iris region and the threshold value for a degree of similarity between an iris code generated based on an iris template and the pre-registered iris code to be low.

In operation 1211, the processor 120 may acquire at least a partial image of a face including an eye of the user, i.e., an appearance image, through the camera unit 170. In operation 1213, the processor 120 may detect a partial region of the iris and a boundary of the eye based on the acquired appearance image. In operation 1215, the processor 120 may generate an iris template based on at least the partial region of the iris and the boundary of the eye, which have been detected in operation 1213. In operation 1217, the processor 120 may determine valid regions from among divided regions in the iris template. In operation 1219, the processor 120 may calculate at least one of the number and an area of valid regions. According to an embodiment, operations 1211 through 1219 are the same as operations 507 through 515 of FIG. 5, respectively, and thus a detailed description thereof is omitted.

In operation 1221, the processor 120 may determine whether at least one of the number and area of valid regions is equal to or greater than the adjusted authentication level, e.g., the threshold value for an iris region, which has been adjusted in operation 1209.

According to an embodiment, when it is set in operation 1209 that only the threshold value for a degree of similarity between an iris code generated based on an iris template and the pre-registered iris code is adjusted, the processor 120 may determine whether at least one of the number and area of valid regions is equal to or greater than the non-adjusted authentication level, e.g., the threshold value for an iris region, which has been confirmed in operation 1205.

According to an embodiment, if it is determined in operation 1221 that the at least one of the number and area of valid regions is less than the adjusted authentication level, the processor 120 may return to operation 1211. For example, if the processor 120 has determined that the at least one of the number and area of valid regions is less than the adjusted authentication level, the processor 120 may control the camera unit 170 to re-photograph the user (or the iris of the user).

According to another embodiment, if it is determined in operation 1209 that only the threshold value for a degree of similarity between an iris code generated based on an iris template and the pre-registered iris code is adjusted, and if it is determined in operation 1221 that the at least one of the number and area of valid regions is less than the adjusted authentication level, the processor 120 may return to operation 1211 and control the camera unit 170 to re-photograph the user (or the iris of the user).

If it is determined in operation 1221 that the at least one of the number and area of valid regions is equal to or greater than the adjusted authentication level, the processor 120 may generate an iris code in operation 1223. In operation 1225, the processor 120 may determine a degree of similarity (or a degree of matching) between the generated iris code and a pre-registered (or reference) iris code by comparing the generated iris code with the pre-registered iris code. Operations 1223 and 1225 are the same as operations 519 and 521 of FIG. 5, respectively, and thus a detailed description thereof is omitted.

In operation 1227, the processor 120 may determine whether the degree of similarity between the generated iris code and the pre-registered iris code is equal to or greater than the adjusted authentication level, e.g., the adjusted threshold value for the degree of similarity between the iris code and the pre-registered iris code, which has been adjusted in operation 1209.

According to an embodiment, if it is determined in operation 1209 that only the threshold value for an iris code based on an iris template is adjusted, the processor 120 may determine whether the degree of similarity between the generated iris code and the pre-registered iris code is equal to or greater than the non-adjusted authentication level, e.g., the threshold value for the degree of similarity between the iris code and the pre-registered iris code, which has been confirmed in operation 1205.

According to an embodiment, if it is determined in operation 1227 that the degree of similarity between the generated iris code and the pre-registered iris code is less than the adjusted threshold value, the processor 120 may return to operation 1211 and control the camera unit 170 to re-photograph the user.

According to another embodiment, if it is determined in operation 1209 that only the threshold value for an iris code based on an iris template is adjusted, and if it is determined that the degree of similarity between the generated iris code and the pre-registered iris code is less than the confirmed threshold value, the processor 120 may return to operation 1211 and control the camera unit 170 to re-photograph the user (or the iris of the user).

If the processor 120 has determined in operation 1227 that the degree of similarity between the generated iris code and the pre-registered iris code is equal to or greater than the adjusted threshold value, the processor 120 may determine that the iris authentication is successful and end the iris authentication by executing the content of which execution has been requested in operation 1229.

According to an embodiment, if it is determined in operation 1209 that only the threshold value for an iris code based on an iris template is adjusted, and if it is determined that the degree of similarity between the generated iris code and the pre-registered iris code is equal to or greater than the confirmed threshold value, the processor 120 may determine that the iris authentication is successful and end the iris authentication by executing the content of which execution has been requested.

FIGS. 13A-13D illustrate iris authentication related diagrams for describing a user authentication method according to an embodiment of the present disclosure.

FIGS. 13A-13D illustrate setting of a security level, e.g., a threshold value for an iris region, by a user. For example, images 1301 and 1305 show a location of the electronic device 100 and a security level (or an authentication level) set by the user, and images 1303 and 1307 show outputs of security levels set in correspondence with the images 1301 and 1305, respectively.

When the user sets a current location of the electronic device 100 to be home as an ambient situation of the electronic device 100 and sets the security level to be low as shown in the image 1301, as shown in the image 1303, an iris authentication may be performed by applying a threshold value for a relatively smaller iris region, i.e., a lower security level, than in the image 1307. According to an embodiment, as shown in the images 1303 and 1307, to guide an iris range used to perform an iris authentication according to a set security level, the processor 120 may control the display 150 to display a sentence such as "For iris recognition at 'home', open your eye as much as at least the size shown above" or "For iris recognition at 'company', open your eye as much as at least the size shown above".

When the user sets a current location of the electronic device 100 to be a company as situation information and sets the security level to be high as shown in the image 1305, as shown in the image 1307, an iris authentication may be performed by applying a relatively larger iris range, i.e., a higher security level, than in the image 1303. For example, only if the iris range acquired in the image 1307 is relatively larger than the iris range acquired in the image 1303, an iris authentication process thereafter may be performed.

According to an embodiment, as shown in the images 1303 and 1307, the processor 120 may control the display 150 to display an iris template 1310 or 1330 corresponding to a set security level, e.g., a threshold value for an iris range, an eye boundary 1320 or 1340, and a guidance sentence in a pop-up window form. However, the pop-up window output is only illustrative, and the processor 120 may control the display 150 to display an iris template corresponding to a set security level, an eye boundary, and a guidance sentence in various forms, e.g., a separate window or a multi-window.

FIGS. 14A-14D illustrates an iris authentication related diagram for describing a user authentication method according to an embodiment of the present disclosure. FIGS. 14A-14D may correspond to examples in which an authentication process is performed according to whether a certain region of an iris is included in an acquired iris region.

Figure 14A:
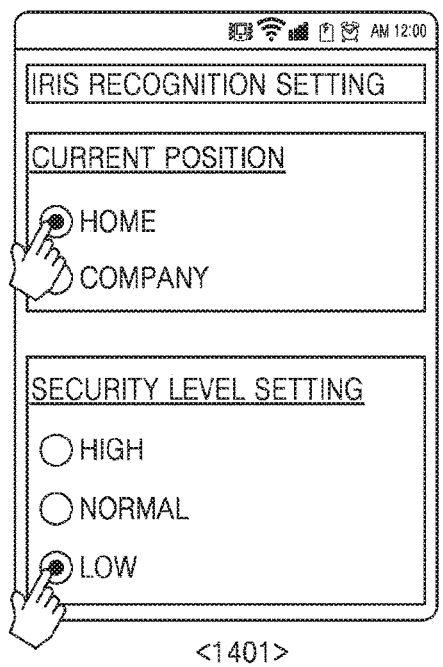
FIGS. 14A-14D illustrate iris authentication related diagrams for describing a user authentication method according to various embodiments of the present disclosure.
Figure 14B:
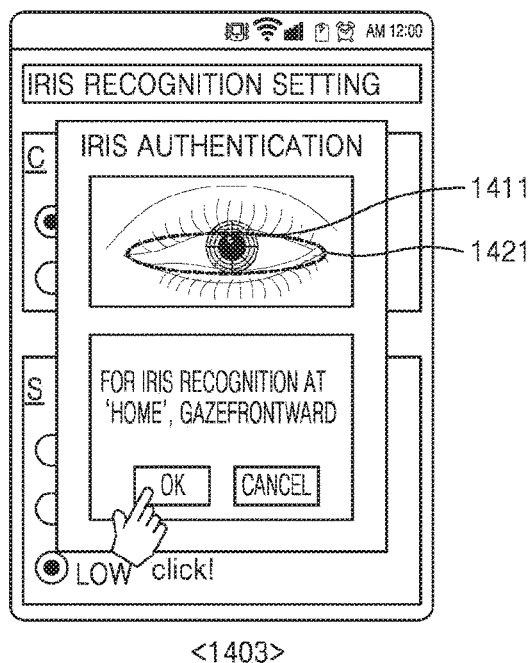
Figure 14C:
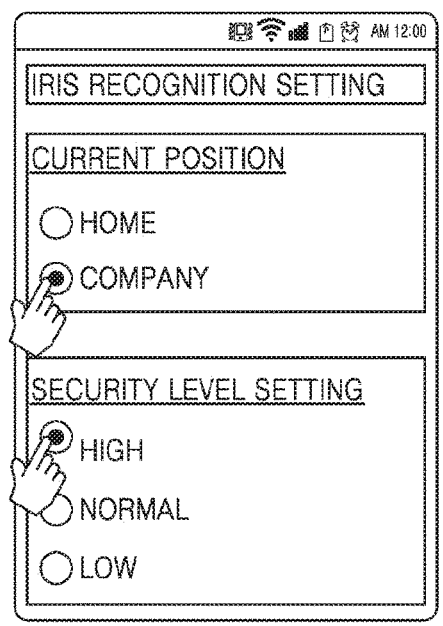

According to an embodiment, images 1401 and 1405 of FIGS. 14A and 14C show a location of the electronic device 100 and a security level set by a user. According to an embodiment, as shown in the image 1401, when the security level is set to be low, it may not be required for an iris authentication that a certain region of an iris is included in an iris range. For example, when an iris is acquired with a certain range or more, the iris authentication may be performed without re-photographing. When the security level is set to be low, the processor 120 may control the display 150 to display a guidance sentence such as "For iris recognition at 'home', gaze frontward" as shown in an image 1403.

According to an embodiment, when the security level is set to be high, it may be required for an iris authentication that a certain region of an iris, e.g., an upper portion 1450 of the iris, is included in an iris range. For example, the processor 120 may perform the iris authentication only if the upper portion 1450 of the iris as a designated certain region of the iris is included in the iris range. However, the designated certain region of the iris is not limited to the upper portion 1450 of the iris. When the security level is set to be high, the processor 120 may control the display 150 to display a guidance sentence such as "For iris recognition at 'company', gaze downward" as shown in an image 1407 to acquire the designated certain region of the iris.

Figure 14D:
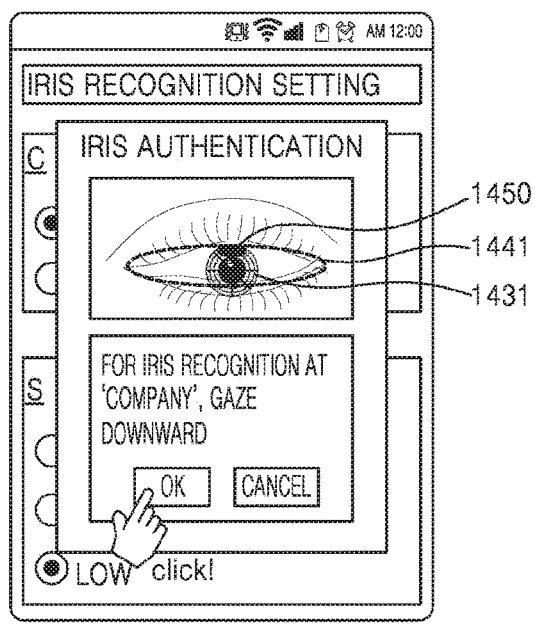

According to an embodiment, as shown in the images 1403 and 1407 of FIGS. 14B and 14D, the processor 120 may control the display 150 to display an iris template 1411 or 1431 corresponding to a set security level, e.g., a threshold value for an iris range, an eye boundary 1421 or 1441, and the like in a pop-up window form.

FIGS. 15A, 15B, and 16A-16C illustrate iris authentication related diagrams for describing a user authentication method according to another embodiment. FIGS. 15A, 15B, and 16A-16C show an iris authentication process according to differently adjusted authentication levels when content of which execution has been requested is identical as a mobile payment and when situation information, e.g., a location (or place) of the electronic device 100, varies.

Figure 15A:
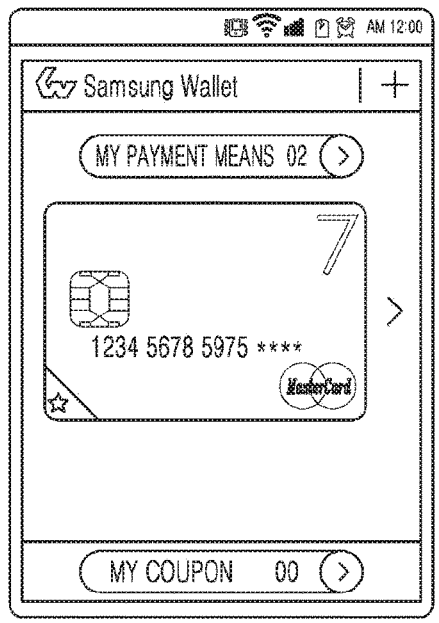
FIGS. 15A and 15B illustrate iris authentication related diagrams for describing a user authentication method according to various embodiments of the present disclosure.
Figure 15B:
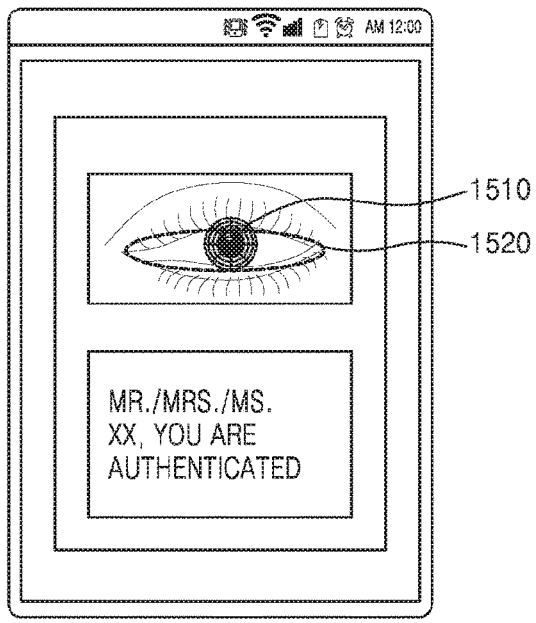

As shown in an image 1501 of FIG. 15A, when a user runs a mobile payment application at home, for example, as shown in an image 1503 of FIG. 15B, an iris authentication may be successful when a small number of or a narrow area of valid regions in an iris template 1510 are acquired within eye boundary 1520.

As shown in an image 1601 of FIG. 16A, when the user runs the mobile payment application at a company, for example, as shown in an image 1603 of FIG. 16B, an iris authentication may fail when the same small number of or the same narrow area of valid regions in an iris template 1610 within eye boundary 1620 as in the image 1503 are acquired. According to an embodiment, when the iris authentication fails, the processor 120 may control the camera unit 170 to perform re-photographing.

According to an embodiment, the processor 120 may control the output unit 190 to output a re-photographing notification in a form of a voice, mechanical vibrations, or light. For example, the processor 120 may control the display 150 to display a guidance sentence such as "Re-photographing is required. Please open your eye wider" or control the output unit 190 (e.g., an audio output unit) to output a voice. As another example, the processor 120 may control the output unit 190 to output mechanical vibrations or light for inducing re-photographing.

According to an embodiment, after the re-photographing, as shown in an image 1605 of FIG. 16C, when a relatively larger number or area of valid regions in an iris template 1630 within eye boundary 1640 than the number or area of valid regions in the iris template 1610 shown in the image 1603 are acquired through the camera unit 170, the processor 120 may determine that the iris authentication is successful.

Figure 17A:
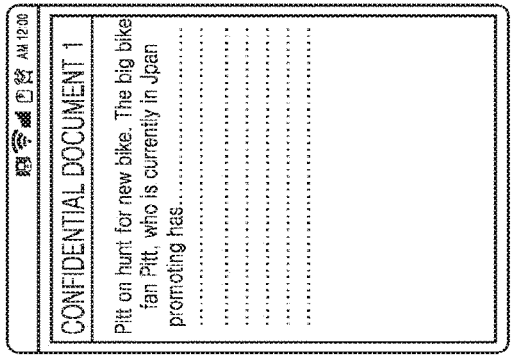
FIGS. 17A-17D illustrate iris authentication related diagrams for describing a user authentication method according to various embodiments of the present disclosure.
Figure 17B:
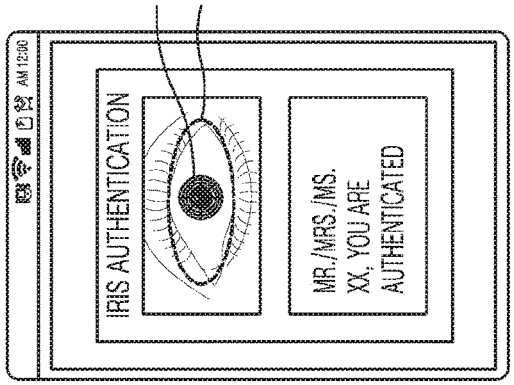
Figure 17C:
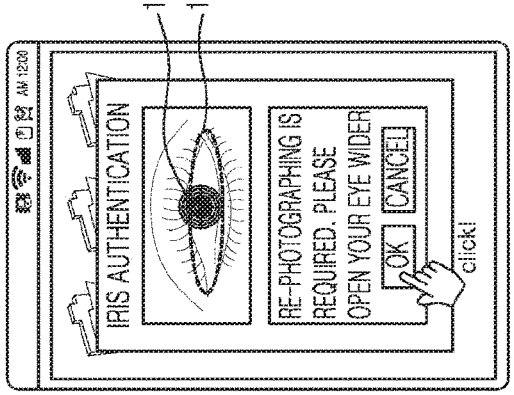
Figure 17D:
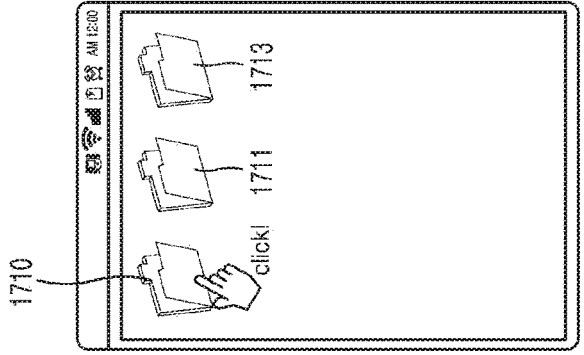
Figure 18A:
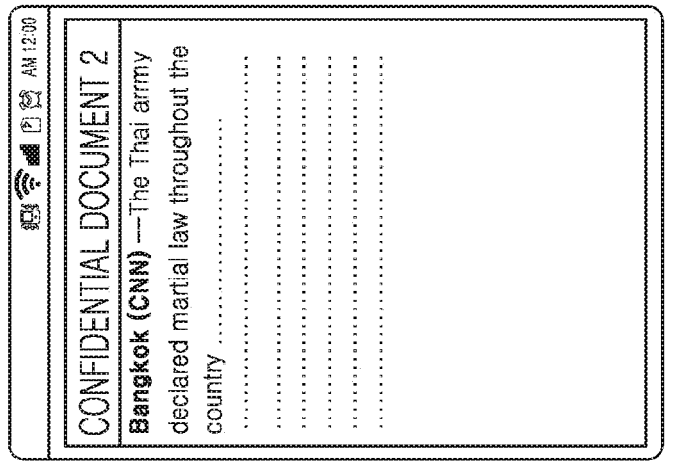
FIGS. 18A-C illustrate iris authentication related diagrams for describing a user authentication method according to various embodiments of the present disclosure.
Figure 18B:
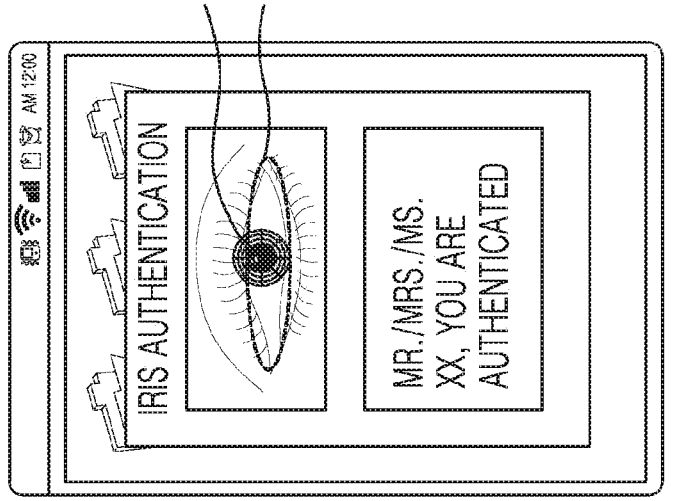
Figure 18C:
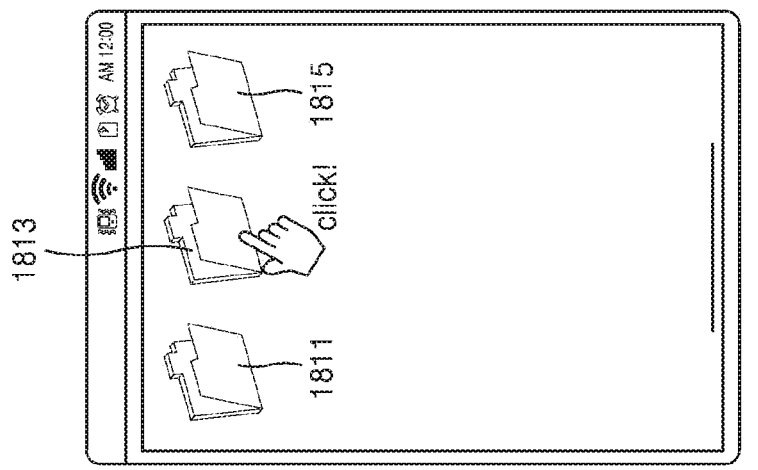

FIGS. 17A-17D and 18A-18C illustrate iris authentication related diagrams for describing a user authentication method according to various embodiments of the present disclosure. FIGS. 17A-17D and 18A-18C show an iris authentication process performed according to authentication levels set to content of which execution has been requested when the content include, for example, electronic documents of the same type (or format), and when a degree of requiring security varies. For example, FIGS. 17A-17D show an iris authentication process when an electronic document for which an authentication level is set to be high is executed, and FIGS. 18A-18C show an iris authentication process when an electronic document for which an authentication level is set to be low is executed.

As shown in an image 1701 of FIG. 17A, when a user touches, for example, an electronic document icon, to execute, for example, an electronic document 1710 of which an authentication level is set to be high among a plurality of electronic documents 1710 through 1713, if a narrow range of iris (or an iris template 1720) within eye boundary 1730 is acquired as shown in an image 1703 of FIG. 17B, re-photographing may be requested. In this case, as shown in an image 1705 of FIG. 17C, when a wide range of iris (or an iris template 1740) within eye boundary 1750, e.g., a value equal to or greater than a threshold value for an iris range set as a wide range, is acquired, the iris authentication process may be performed. An image 1707 of FIG. 17D shows a screen image in the case of a successful iris authentication when an iris range equal to or greater than the threshold value for an iris range is acquired and a degree of similarity between an iris code generated from the acquired iris range and a pre-registered iris code is a preset threshold value or more.

As shown in an image 1801 of FIG. 18A, when a user touches, for example, an icon of an electronic document 1813, to execute, for example, the electronic document 1813 of which an authentication level is set to be low among a plurality of electronic documents 1811 through 1815, even though a narrow range of iris is acquired (or an iris template 1820 of a narrow range is generated) within eye boundary 1830 as shown in an image 1803 of FIG. 18B, the iris authentication process thereafter may be performed without re-photographing. An image 1805 of FIG. 18C shows a screen image in the case of a successful iris authentication when an iris range equal to or greater than the threshold value for an iris range, which is set to be low, is acquired and a degree of similarity between an iris code generated from the acquired iris range and a pre-registered iris code is a preset threshold value or more.

FIGS. 19A-19C and 20A-20D illustrate iris authentication related diagrams for describing a user authentication method according to an embodiment of the present disclosure. FIGS. 19A-19C and 20A-20D show an iris authentication process performed according to authentication levels changed according to situation information when content of which execution has been requested include, for example, the same electronic documents.

According to an embodiment, the content of which execution has been requested may be a document for which a degree of requiring security is high. For example, the content of which execution has been requested may be an electronic document set to a high authentication level when situation information is not taken into account.

According to an embodiment, FIG. 19A shows an iris authentication process performed based on a changed authentication level when an electronic document 1911 of which an authentication level is set to be high among a plurality of electronic documents 1911 through 1915 is executed at, for example, a company, e.g., when situation information is information indicating that a location of the electronic device 100 (or a location of the user of the electronic device 100) is a company. FIG. 20A shows an iris authentication process performed based on a changed authentication level when an electronic document 2011 of which an authentication level is set to be high among a plurality of electronic documents 2011 through 2015 is executed at, for example, home, e.g., when situation information is information indicating that a location of the electronic device 100 (or a location of the user of the electronic device 100) is home.

As shown in an image 1901 of FIG. 19A, when the electronic document 1911 of which an authentication level is set to be high is highly related to a company, and when the electronic document 1911 is executed at the company, for example, without requiring high security about electronic documents within the company, the authentication level of the electronic document 1911, which is set to be high, may be adjusted to be low. For example, the authentication level of the electronic document 1911 may be adjusted according to situation information such that the electronic document 1911 related to the company, which requires high security when the situation information is not taken into account, has a low authentication level when information indicating that the electronic device 100 is located at the company is taken into account.

As shown in an image 1903 of FIG. 19B, even though a narrow range of iris is acquired (or an iris template 1910 of a narrow range is generated) within eye boundary 1920, the iris authentication may be successful without re-photographing. An image 1905 of FIG. 19C shows a screen image displayed when the iris authentication is successful based on the narrow range of iris in the image 1903.

As shown in an image 2001 of FIG. 20A, when the electronic document 2011 of which an authentication level is set to be high is highly related to a company and is rarely related to home, when the electronic document 2011, for example, does not require high security within the company but requires high security at home, and when the electronic document 2011 is executed at home, the authentication level of the electronic document 2011, which is set to be high, may be maintained as it is. For example, the authentication level of the electronic document 2011 may be maintained such that the electronic document 2011 related to the company, which requires high security when the situation information is not taken into account, has a high authentication level even when information indicating that the electronic device 100 is located at home is taken into account.

As shown in an image 2003 of FIG. 20B, when the narrow range of iris as in the image 1903 is acquired (or when an iris template 2020 of a narrow range is generated) within eye boundary 2030, re-photographing may be requested. As shown in an image 2005 of FIG. 20C, when a wider range of iris than in the image 2003 of FIG. 20B is acquired (or when an iris template 2040 of a wide range is generated) within eye boundary 2050, and when the iris authentication based on the acquired wide range of iris is successful, an executed electronic document as shown in an image 2007 of FIG. 20D may be displayed.

A user authentication method and an electronic device supporting the same according to one or more embodiment may provide convenience to a user and support reinforcement of security by adaptively setting an authentication level according to the necessity of security for content of which execution has been requested or ambient information.

The embodiments described above can be written as computer-executable programs and can be implemented in general-use digital computers that execute the programs using a non-transitory computer-readable recording medium. In addition, a structure of data used in the embodiments described above may be recorded in the non-transitory computer-readable recording medium through various means. Examples of the non-transitory computer-readable recording medium include storage media such as magnetic storage media (e.g., read-only memory (ROM), floppy disks, hard disks, etc.) and optical recording media (e.g., compact disc ROMs (CD-ROMs), or digital versatile discs (DVDs)).

It should be understood that embodiments described herein should be considered in a descriptive sense only and not for purposes of limitation. Descriptions of features or aspects within each embodiment should typically be considered as available for other similar features or aspects in other embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A user authentication method for an electronic device, the method comprising:
    detecting a content execution event;
    confirming an authentication level of content requiring iris authentication among a plurality of authentication methods, based on the detected content execution event;
    acquiring an appearance image through a camera unit;
    extracting valid regions related to an iris of a user from the acquired appearance image;
    re-acquiring the appearance image when the valid regions do not include preset certain iris regions of the user; and
    performing authentication of the user by comparing iris authentication reference information related to the confirmed authentication level with the extracted valid regions.

2. The user authentication method of claim 1, wherein the iris authentication reference information includes at least one of an area of the iris and a certain region of the iris.

3. The user authentication method of claim 2, wherein the area of the iris is a first threshold value for at least one of an area of and a number of valid regions corresponding to an iris region among a plurality of divided regions in an iris template to be generated based on the iris region.

4. The user authentication method of claim 1, further comprising determining whether to re-acquire the appearance image by comparing an iris region in the appearance image with the iris authentication reference information.

5. The user authentication method of claim 4, wherein the determining whether to re-acquire the appearance image comprises:
    detecting the iris region and a boundary of an eye of the user which are included in the appearance image;
    dividing the detected iris region into a plurality of regions and generating an iris template corresponding to the plurality of divided regions; and
    determining whether to re-acquire the appearance image by comparing at least one of an area of and a number of the extracted valid regions corresponding to the iris region among the plurality of divided regions included in the iris template with a threshold value for the iris region.

6. The user authentication method of claim 1, further comprising setting a first threshold value for a degree of similarity between iris information generated from an iris image in the iris region and pre-registered iris information according to the confirmed authentication level.

7. The user authentication method of claim 1, further comprising checking situation information of the electronic device,
    wherein the confirming of the authentication level comprises confirming if a preset authentication level corresponds to the situation information.

8. The user authentication method of claim 7, wherein the situation information includes at least one of a location of the electronic device, a location of the user of the electronic device, a number of people around the electronic device, an identity of the people around the electronic device, background information of the electronic device, a user movement history of the electronic device, a moving speed of the electronic device, a re-authentication interval after previous authentication, a type of the electronic device, an internal configuration of the electronic device, ambient illumination of the electronic device, a moving distance of the electronic device, and information as to whether a user who tries the user authentication corresponds to a user registered in the electronic device.

9. The user authentication method of claim 1, wherein the performing of the authentication of the user comprises:
    requesting a server to provide content for iris authentication; and
    receiving the requested content for iris authentication from the server.

10. An electronic device comprising:
    a camera unit configured to acquire an appearance image; and
    a processor configured to:
        detect a content execution event and confirm an authentication level of content requiring iris authentication among a plurality of authentication methods, based on the detected content execution event,
        extract valid regions related to an iris of a user from the appearance image acquired by the camera unit,
        re-acquire the appearance image when the valid regions do not include preset certain regions of the user's iris, and
        perform authentication of the user.

11. The electronic device of claim 10, wherein the iris authentication reference information includes at least one of an area of the iris and a certain region of the iris.

12. The electronic device of claim 11, wherein the area of the iris is a first threshold value for at least one of an area of and a number of valid regions corresponding to an iris region among a plurality of divided regions in an iris template to be generated based on the iris region.

13. The electronic device of claim 10, wherein the processor is further configured to determine whether to re-acquire the appearance image by comparing an iris region in the appearance image with the iris authentication reference information.

14. The electronic device of claim 13, wherein the processor is further configured to:
    detect the iris region and a boundary of an eye of the user which are included in the appearance image,
    divide the detected iris region into a plurality of regions,
    generate an iris template corresponding to the plurality of divided regions, and
    determine whether to re-acquire the appearance image by comparing at least one of an area of and a number of the extracted valid regions corresponding to the iris region among the plurality of divided regions in the iris template with a third threshold value for the iris region.

15. The electronic device of claim 10, wherein the processor is further configured to set a first threshold value for a degree of similarity between iris information generated from an iris image in the iris region and pre-registered iris information according to the confirmed authentication level.

16. The electronic device of claim 10, wherein the processor is further configured to check situation information of the electronic device and confirm if a preset authentication level corresponds to the situation information.

17. The electronic device of claim 16, wherein the situation information includes at least one of a location of the electronic device, a location of the user of the electronic device, a number of people around the electronic device, an identity of the people around the electronic device, background information of the electronic device, a user movement history of the electronic device, a moving speed of the electronic device, a re-authentication interval after previous authentication, a type of the electronic device, an internal configuration of the electronic device, ambient illumination of the electronic device, a moving distance of the electronic device, and information as to whether a user who tries the user authentication corresponds to a user registered in the electronic device.

18. The electronic device of claim 12, wherein the processor is further configured to request a server to provide content for iris authentication and receive the requested content for iris authentication from the server.

19. A non-transitory computer processor readable storage medium including instructions, executable by a computer processor, stored thereon to perform the method of claim 1.

* * * * *